US012591248B2

(12) United States Patent
Edo et al.

(10) Patent No.: US 12,591,248 B2
(45) Date of Patent: Mar. 31, 2026

(54) AGRICULTURAL MACHINE AND GESTURE RECOGNITION SYSTEM FOR AGRICULTURAL MACHINE

(71) Applicant: Kubota Corporation, Osaka (JP)

(72) Inventors: Shunsuke Edo, Sakai (JP); Shunsuke Miyashita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 24 days.

(21) Appl. No.: 18/744,762

(22) Filed: Jun. 17, 2024

(65) Prior Publication Data

US 2024/0338027 A1    Oct. 10, 2024

Related U.S. Application Data

(63) Continuation of application No. PCT/JP2022/042923, filed on Nov. 18, 2022.

(30) Foreign Application Priority Data

Dec. 21, 2021    (JP) ................................. 2021-207030

(51) Int. Cl.
| | |
|---|---|
| *G05D 1/223* | (2024.01) |
| *A01B 69/04* | (2006.01) |
| *G05D 1/82* | (2024.01) |
| *G05D 105/15* | (2024.01) |
| *G05D 107/20* | (2024.01) |

(52) U.S. Cl.
CPC ........... *G05D 1/223* (2024.01); *A01B 69/008* (2013.01); *G05D 1/82* (2024.01); *G05D 2105/15* (2024.01); *G05D 2107/21* (2024.01)

(58) Field of Classification Search
None
See application file for complete search history.

(56) References Cited

U.S. PATENT DOCUMENTS

| | | | |
|---|---|---|---|
| 12,365,366 B1 * | 7/2025 | Kaplan ................ A01D 34/824 |
| 2009/0278915 A1 | 11/2009 | Kramer et al. |
| 2021/0068334 A1 | 3/2021 | Mutahi et al. |
| 2021/0164194 A1 | 6/2021 | Nishi |

FOREIGN PATENT DOCUMENTS

| | | |
|---|---|---|
| EP | 3725143 A1 | 10/2020 |
| JP | 2014-221636 A | 11/2014 |
| JP | 2018-170989 A | 11/2018 |
| JP | 6564483 B1 | 8/2019 |
| JP | 2021-60824 A | 4/2021 |
| WO | 2020/032267 A1 | 2/2020 |

OTHER PUBLICATIONS

Official Communication issued in International Patent Application No. PCT/JP2022/042923, mailed on Dec. 27, 2022.
Official Communication issued in corresponding European Patent Application No. 22910704.0, mailed on Apr. 23, 2025, 8 pages.

* cited by examiner

*Primary Examiner* — Tamara L Weber
(74) *Attorney, Agent, or Firm* — Keating & Bennett, LLP

(57)    ABSTRACT

An agricultural machine includes a controller configured or programmed to control an action of the agricultural machine, and at least one sensor to sense an environment around the agricultural machine. When the at least one sensor acquires motion information of a person performing a gesture, the controller is configured or programmed to cause the agricultural machine to perform an action determined based on a type of the gesture and an operational authority granted to the person.

19 Claims, 13 Drawing Sheets

*FIG. 9A*
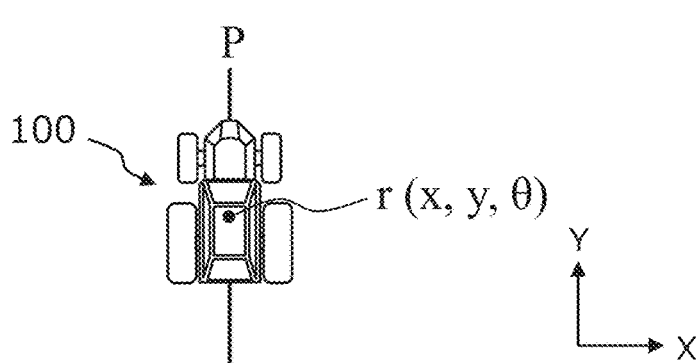
P
100
r (x, y, θ)
Y
X
*FIG. 9B*
P
Δx
r (x, y, θ)
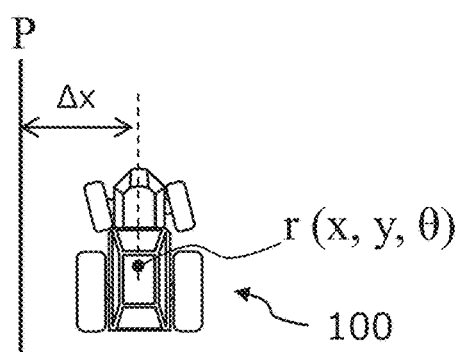
100
*FIG. 9C*
P
Δx
r (x, y, θ)
100
*FIG. 9D*
P
Δθ
100
r (x, y, θ)
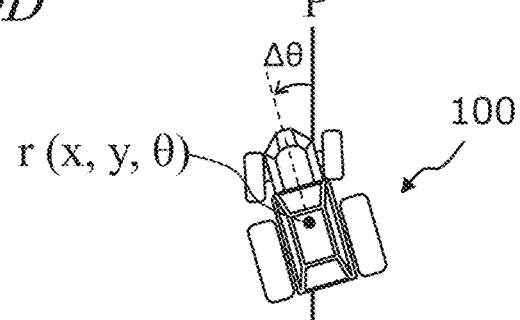

*FIG. 13A*

| IDENTIFICATION INFORMATION (UNIQUE ID) | LEVEL OF OPERATIONAL AUTHORITY | |
|---|---|---|
| 0xAA | HIGH | PERSON A |
| 0xBB | LOW | PERSON B |
| 0xCC | LOW | PERSON C |
| 0xDD | HIGH | PERSON D |
| · | · | |
| · | · | |
| · | · | |

*FIG. 13B*

| IDENTIFICATION INFORMATION (UNIQUE ID) | LEVEL OF OPERATIONAL AUTHORITY | |
|---|---|---|
| 0xAA | HIGHEST | PERSON A |
| 0xBB | LOW | PERSON B |
| 0xCC | LOW | PERSON C |
| 0xDD | HIGH | PERSON D |
| · | · | |
| · | · | |
| · | · | |

*FIG. 13C*

| IDENTIFICATION INFORMATION (UNIQUE ID) | OPERATIONAL AUTHORITY | |
|---|---|---|
| 0xAA | AUTHORIZED | PERSON A |
| 0xDD | AUTHORIZED | PERSON D |
| · | · | |
| · | · | |
| · | · | |

*FIG. 14*

```
┌─────────────< SECOND GROUP >─────────────┐
│                                           │
│  -  CAUSE AGRICULTURAL MACHINE TO RESUME TRAVELING
│  -  STOP PRIME MOVER                       │
│  -  OPERATIONS IN GENERAL OF IMPLEMENT     │
│  -  CAUSE AGRICULTURAL MACHINE TO MOVE OUT OF FIELD
│  -  OPERATIONS IN GENERAL OF AGRICULTURAL MACHINE
│  BEING OUTSIDE FIELD                       │
│                                           │
│    ┌────────< FIRST GROUP >────────┐      │
│    │                                │      │
│    │  -  STOP AGRICULTURAL MACHINE  │      │
│    │  -  DECELERATE AGRICULTURAL MACHINE   │
│    │                                │      │
│    └────────────────────────────────┘      │
│                                           │
└───────────────────────────────────────────┘
```

*FIG. 15*

```
┌─────────────< THIRD GROUP >─────────────┐
│  -  CAUSE AGRICULTURAL MACHINE TO MOVE OUT OF FIELD
│  -  OPERATIONS IN GENERAL OF AGRICULTURAL MACHINE
│  BEING OUTSIDE FIELD                      │
│                                           │
│   ┌────────< SECOND GROUP >────────┐      │
│   │                                 │      │
│   │  -  CAUSE AGRICULTURAL MACHINE TO RESUME TRAVELING
│   │  -  STOP PRIME MOVER            │      │
│   │  -  OPERATIONS IN GENERAL OF IMPLEMENT│
│   │                                 │      │
│   │   ┌──────< FIRST GROUP >──────┐ │      │
│   │   │                           │ │      │
│   │   │  -  STOP AGRICULTURAL MACHINE
│   │   │  -  DECELERATE AGRICULTURAL MACHINE
│   │   │                           │ │      │
│   │   └───────────────────────────┘ │      │
│   │                                 │      │
│   └─────────────────────────────────┘      │
│                                           │
└───────────────────────────────────────────┘
```

AGRICULTURAL MACHINE AND GESTURE RECOGNITION SYSTEM FOR AGRICULTURAL MACHINE

CROSS REFERENCE TO RELATED APPLICATIONS

This application claims the benefit of priority to Japanese Patent Application No. 2021-207030 filed on Dec. 21, 2021 and is a Continuation Application of PCT Application No. PCT/JP2022/042923 filed on Nov. 18, 2022. The entire contents of each application are hereby incorporated herein by reference.

BACKGROUND OF THE INVENTION

1. Field of the Invention

The present disclosure relates to agricultural machines and gesture recognition systems for use in agricultural machines.

2. Description of the Related Art

Research and development has been directed to the automation of agricultural machines to be used in fields. For example, agricultural machines that perform autonomous driving in an unmanned state while being monitored from within or around a field have been put to practical use. Japanese Laid-Open Patent Publication No. 2018-170989 discloses an autonomous driving system that controls autonomous driving of an agricultural machine by using a remote operation device that is communicably connected to the agricultural machine. An operator can instruct the agricultural machine to start or stop autonomous driving by operating the remote operation device.

SUMMARY OF THE INVENTION

Example embodiments of the present invention provide techniques for improving the convenience of operating agricultural machines capable of performing self-driving from a remote location.

An agricultural machine capable of performing self-driving according to a non-limiting example embodiment of the present disclosure includes a controller configured or programmed to control an action of the agricultural machine, and at least one sensor to sense an environment around the agricultural machine, wherein when the at least one sensor acquires motion information of a person performing a gesture, the controller is configured or programmed to cause the agricultural machine to perform an action determined based on a type of the gesture and an operational authority granted to the person.

A gesture recognition system according to a non-limiting example embodiment of the present disclosure is for use in an agricultural machine capable of performing self-driving and including a controller configured or programmed to control an action of the agricultural machine, the gesture recognition system including at least one sensor to sense an environment around the agricultural machine, a processor configured or programmed to process sensing data output from the at least one sensor, and a terminal usable to set an operational authority for a person involved in agricultural work, wherein the processor is configured or programmed to recognize a type of gesture based on the sensing data output from the at least one sensor when motion information of the person performing the gesture is acquired, and the gesture recognition system is configured or programmed to instruct the controller to cause the agricultural machine to perform an action determined based on the type of gesture and the operational authority granted to the person.

General or specific aspects of the present disclosure may be implemented using a device, a system, a method, an integrated circuit, a computer program, a non-transitory computer-readable storage medium, or any combination thereof. The computer-readable storage medium may be inclusive of a volatile storage medium or a non-volatile storage medium. The device may include a plurality of devices. In the case where the device includes two or more devices, the two or more devices may be disposed within a single apparatus, or divided over two or more separate apparatuses.

According to example embodiments of the present disclosure, it is possible to improve the convenience of operating self-driving agricultural machines from a remote location.

The above and other elements, features, steps, characteristics and advantages of the present invention will become more apparent from the following detailed description of the example embodiments with reference to the attached drawings.

BRIEF DESCRIPTION OF THE DRAWINGS

FIG. 9A is a diagram showing an example of the work vehicle traveling along a target path P.

FIG. 9B is a diagram showing an example of the work vehicle at a position which is shifted rightward from the target path P.

FIG. 9C is a diagram showing an example of the work vehicle at a position which is shifted leftward from the target path P.

FIG. 9D is a diagram showing an example of the work vehicle oriented in an inclined direction with respect to the target path P.

FIG. 13A is a diagram showing an example of a table that maps the identification information of a person to the level of operational authority granted to the person.

FIG. 13B is a diagram showing an example of a table that maps the identification information of a person to the level of operational authority granted to the person.

FIG. 13C is a diagram showing an example of a table that maps the identification information of a person to the level of operational authority granted to the person.

FIG. 14 is a diagram showing the relationship between the first group and the second group.

FIG. 15 is a diagram showing the relationship between the first group, the second group and the third group.

DETAILED DESCRIPTION OF THE EXAMPLE EMBODIMENTS

Figure 1:
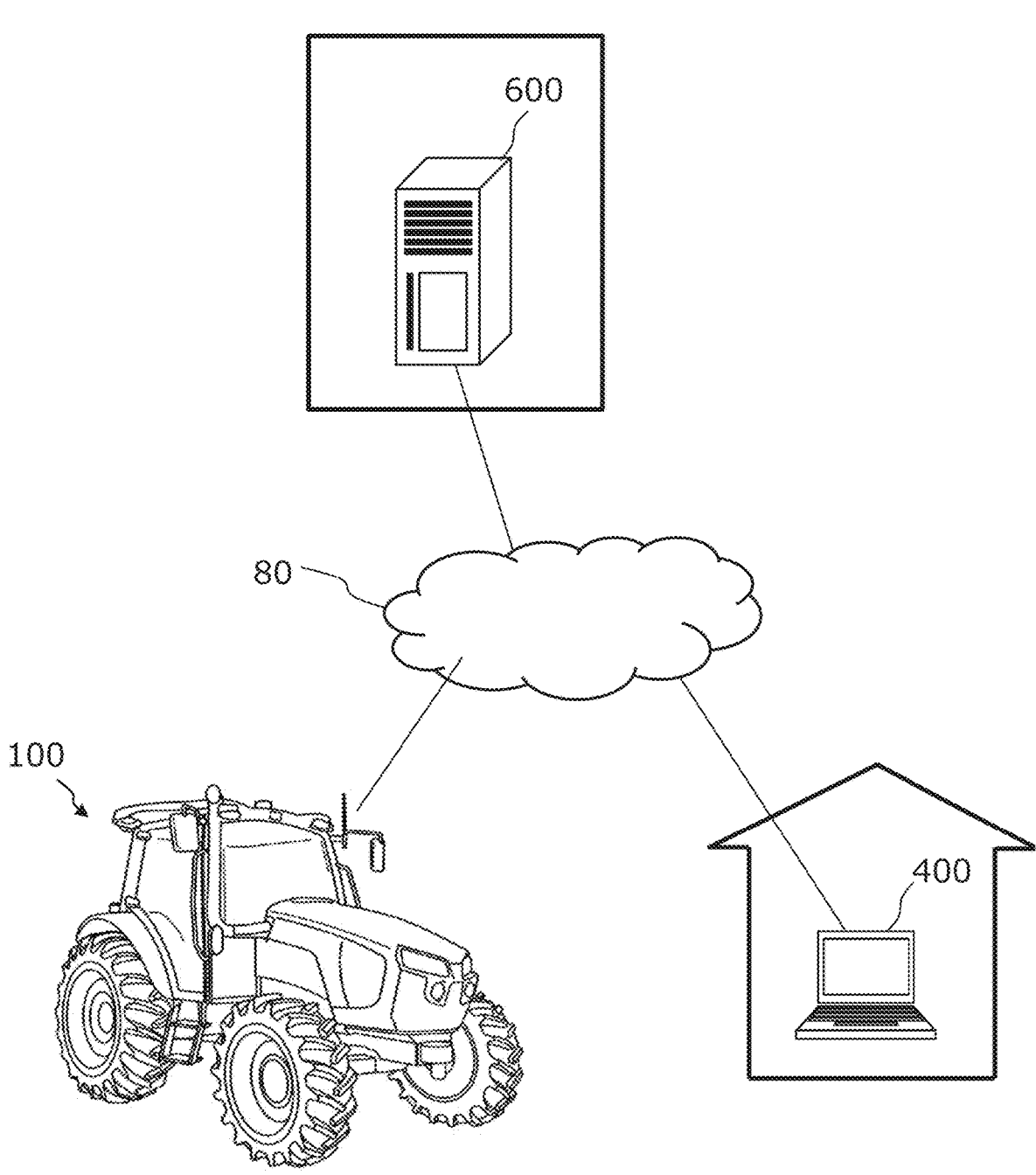
FIG. 1 is a diagram providing an overview of an agriculture management system according to an illustrative example embodiment of the present invention.

In the present disclosure, an "agricultural machine" refers to a machine for agricultural applications. Examples of agricultural machines include tractors, harvesters, rice transplanters, vehicles for crop management, vegetable transplanters, mowers, seeders, spreaders, and mobile robots for agriculture. Not only may a work vehicle such as a tractor function as an "agricultural machine" alone by itself, but also a combination of a work vehicle and an implement that is attached to, or towed by, the work vehicle may function as an "agricultural machine". For the ground surface inside a field, the agricultural machine performs agricultural work such as tilling, seeding, preventive pest control, manure spreading, planting of crops, or harvesting. Such agricultural work or tasks may be referred to as "groundwork", or simply as "work" or "tasks". Travel of a vehicle-type agricultural machine performed while the agricultural machine also performs agricultural work may be referred to as "tasked travel".

"Self-driving" refers to controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work (e.g., the operation of an implement) may be controlled automatically. In the case where the agricultural machine is a vehicle-type machine, travel of the agricultural machine via self-driving will be referred to as "self-traveling". The controller may be configured or programmed to control at least one of steering that is required in the movement of the agricultural machine, adjustment of the moving speed, and beginning and ending of a move. In the case of controlling a work vehicle having an implement attached thereto, the controller may be configured or programmed to control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also move partly based on the user's instructions. Moreover, an agricultural machine that performs self-driving may operate not only in a self-driving mode but also in a manual driving mode, where the agricultural machine moves through manual operations of the driver. When performed not manually but through the action of a controller, the steering of an agricultural machine will be referred to as "automatic steering". A portion of, or the entirety of, the controller may reside outside the agricultural machine. Control signals, commands, data, etc., may be communicated between the agricultural machine and a controller existing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel inside the field or outside the field (e.g., on roads) in an unmanned manner. During an autonomous move, operations of detecting and avoiding obstacles may be performed.

A "work plan" is data defining a plan of one or more tasks of agricultural work to be performed by an agricultural machine. The work plan may include, for example, information representing the order of the tasks of agricultural work to be performed by an agricultural machine and the field where each of the tasks of agricultural work is to be performed. The work plan may include information representing the day and time each of the tasks of agricultural work is to be performed. The work plan may be created by a processor communicating with the agricultural machine to manage the agricultural work, or by a processor mounted on the agricultural machine. The processor can be configured or programmed to create a work plan based on, for example, information input by the user (agricultural business executive, agricultural worker, etc.) manipulating a terminal. In this specification, the processor configured or programmed to communicate with the agricultural machine to manage the agricultural work will be referred to as a "management device". The management device may manage agricultural work of a plurality of agricultural machines. In this case, the management device may create a work plan including information on each task of agricultural work to be performed by each of the plurality of agricultural machines. The work plan may be downloaded to each of the agricultural machines and stored in a storage. In order to perform the scheduled agricultural work, each agricultural machine can automatically go to the field and perform the agricultural work according to the work plan.

An "environment map" is data that representing with a predetermined coordinate system, the position or the region of an object existing in the environment where the agricultural machine moves. The environment map may be referred to simply as a "map" or "map data". The coordinate system defining the environment map may be a world coordinate system such as a geographic coordinate system fixed to the globe, for example. The environment map may include information other than the position (e.g., attribute information or other types of information) for objects that are present in the environment. The environment map encompasses various types of maps, such as a point cloud map or a grid map. Data on a local map or a partial map that is generated or processed in a process of constructing the environment map is also referred to as a "map" or "map data".

A "agricultural road" means a road used mainly for agricultural purposes. An agricultural road is not limited to a road paved with asphalt, and encompasses unpaved roads covered with soil, gravel, etc. An agricultural road encompasses roads (including private roads) on which only vehicle-type agricultural machines (e.g., work vehicles such as tractors) are allowed to travel and roads on which general vehicles (passenger cars, trucks, buses, etc.) are allowed to travel. The work vehicles may automatically travel on a general road in addition to an agricultural road. The general road is a road maintained for traffic of general vehicles.

A "gesture" means an action, such as a body gesture or a hand gesture, performed by a person. A hand gesture is primarily a movement of the arm. A body gesture means an action using body parts, such as arms, legs, head, or torso. A gesture includes a repeated continuous action, a momentary action, and a repetition of a momentary action. A gesture also includes an action using an object worn by a person. For example, a gesture includes an action of a person repeatedly putting on and taking off a hat.

Hereinafter, example embodiments of the present disclosure will be described. Note, however, that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. Note that the accompanying drawings and the following description, which are provided by the present inventors so that those skilled in the art can sufficiently understand the present disclosure, are not intended to limit the scope of the claims. In the following description, elements having identical or similar functions are denoted by identical reference numerals.

The following example embodiments are only exemplary, and the techniques according to the present disclosure are not limited to the following example embodiments. For example, numerical values, shapes, materials, steps, orders of steps, layout of a display screen, etc., which are indicated in the following example embodiments are only exemplary, and admit of various modifications so long as it makes technological sense. Any one implementation may be combined with another so long as it makes technological sense to do so.

Hereinafter, example embodiments in which techniques according to the present disclosure are applied to a work vehicle, such as a tractor, which is an example of agricultural machine, will be mainly described. The techniques according to the present disclosure are also applicable to other types of agricultural machines in addition to the work vehicle such as a tractor.

FIG. 1 is a diagram providing an overview of an agriculture management system according to an illustrative example embodiment of the present disclosure. The agriculture management system shown in FIG. 1 includes a work vehicle 100, a terminal 400, and a management device 600. The terminal 400 is a computer used by a user performing remote monitoring of the work vehicle 100. The management device 600 is a computer managed by a business operator managing the agriculture management system. The work vehicle 100, the terminal 400 and the management device 600 can communicate with each other via a network 80. FIG. 1 shows one work vehicle 100 as an example, but the agriculture management system may include a plurality of work vehicles or any other agricultural machine.

The work vehicle 100 according to the present example embodiment is a tractor. The work vehicle 100 can have an implement attached to its rear and/or its front. The work vehicle 100 can travel inside a field while performing agricultural work in accordance with a type of an implement. The work vehicle 100 may travel inside the field or outside the field with no implement being attached thereto.

The work vehicle 100 has a self-driving function. In other words, the work vehicle 100 can travel by the action of a controller, rather than manually. The controller according to the present example embodiment is provided inside the work vehicle 100, and is configured or programmed to control both the speed and steering of the work vehicle 100. The work vehicle 100 can perform self-traveling outside the field (e.g., on roads) as well as inside the field.

The work vehicle 100 includes a device used for positioning or self-position estimation, such as a GNSS receiver and a LiDAR sensor. Based on the position of the work vehicle 100 and information on a target path, the controller of the work vehicle 100 causes the work vehicle 100 to automatically travel. In addition to controlling the travel of the work vehicle 100, the controller also controls the operation of the implement. As a result, while automatically traveling inside the field, the work vehicle 100 is able to perform agricultural work by using the implement. In addition, the work vehicle 100 is able to automatically travel along the target path on a road outside the field (e.g., an agricultural road or a general road). The work vehicle 100 performs self-traveling on a road outside the field while utilizing data output from sensors such as cameras or a LiDAR sensor.

The management device 600 is a computer to manage the agricultural work performed by the work vehicle 100. The management device 600 may be, for example, a server computer that performs centralized management on information regarding the field on the cloud and supports agriculture by use of the data on the cloud. The management device 600, for example, creates a work plan for the work vehicle 100 and causes the work vehicle 100 to perform agricultural work in accordance with the work plan. The management device 600, for example, generates a target path inside the field based on information input by the user using the terminal 400 or another device. The management device 600 may further generate and edit an environment map based on data collected by the work vehicle 100 or another mobile unit using a sensor such as a LiDAR sensor. The management device 600 transmits data on the generated work plan, target path, and environment map to the work vehicle 100. The work vehicle 100 automatically travels and performs agricultural work based on those data.

The terminal 400 is a computer that is used by a user at a remote place from the work vehicle 100. The terminal 400 shown in FIG. 1 is a laptop computer, but the terminal 400 is not limited to this. The terminal 400 may be a stationary computer, such as a desktop PC (personal computer), or a mobile terminal, such as a smartphone or a tablet computer. The terminal 400 may be used to perform remote monitoring of the work vehicle 100 or remote-operate the work vehicle 100. For example, the terminal 400 can display images taken by one or more cameras (imaging devices) provided on the work vehicle 100. The terminal 400 can also display on the display a setting screen for the user to input information necessary to create a work plan (e.g., a schedule for each task of agricultural work) for the work vehicle 100. When the user performs an operation of inputting and sending necessary information on the setting screen, the terminal 400 transmits the input information to the management device 600. The management device 600 creates a work plan based on the information. The terminal 400 may further have a function of displaying a setting screen on the display for the user to input information necessary to set a target path.

Hereinafter, a configuration and an operation of the system according to the present example embodiment will be described in more detail.

Figure 2:
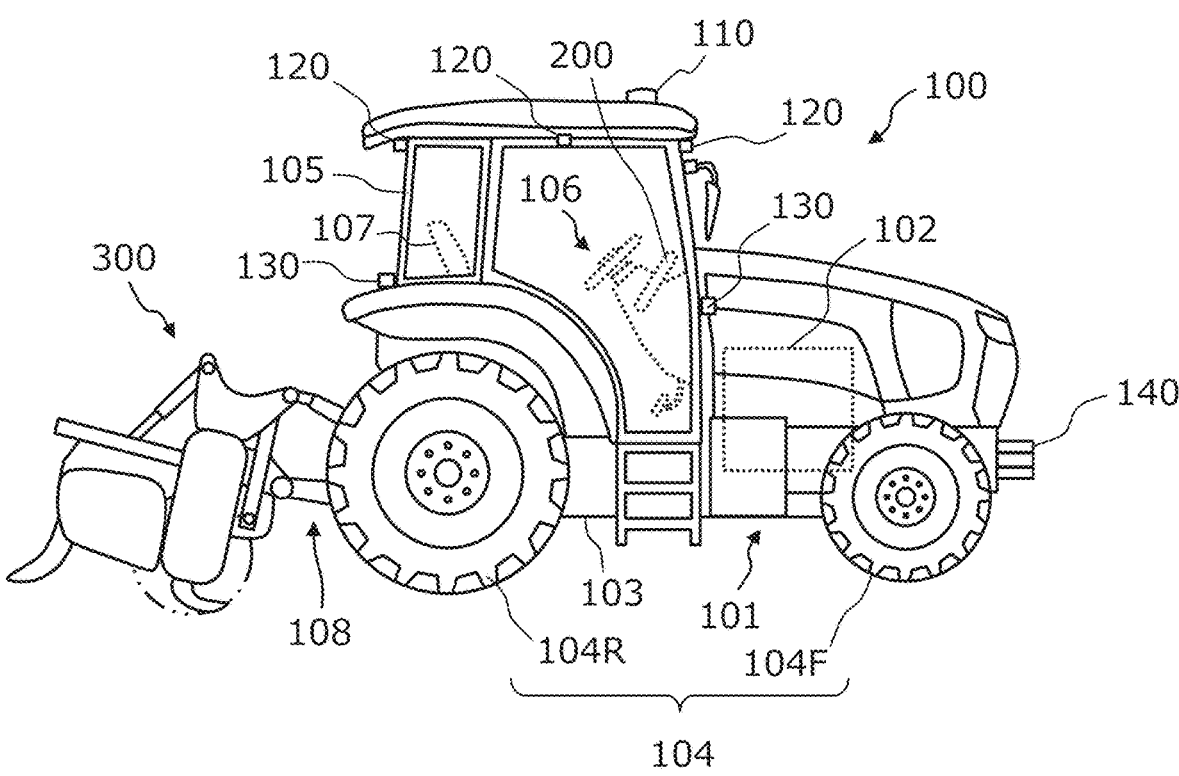
FIG. 2 is a side view schematically showing an example of work vehicle and an example of an implement that is linked to the work vehicle.

FIG. 2 is a side view schematically showing an example of the work vehicle 100 and an example of an implement 300 linked to the work vehicle 100. The work vehicle 100 according to the present example embodiment can operate both in a manual driving mode and a self-driving mode. In the self-driving mode, the work vehicle 100 is able to perform unmanned travel. The work vehicle 100 can perform self-driving both inside a field and outside the field.

As shown in FIG. 2, the work vehicle 100 includes a vehicle body 101, a prime mover (engine) 102, and a transmission device (transmission) 103. On the vehicle body 101, wheels 104 with tires and a cabin 105 are provided. The wheels 104 include a pair of front wheels 104F and a pair of rear wheels 104R. Inside the cabin 105, a driver's seat 107, a steering device 106, and operation switches for manipulation are provided. In the case where the work vehicle 100 performs tasked travel inside the field, crawlers instead of tires may be attached to one or both of the front wheels 104F and the rear wheels 104R.

The work vehicle 100 may include at least one sensors sensing the environment around the work vehicle 100 and a processor configured or programmed to process the sensing data output from the at least one sensor. In the example shown in FIG. 2, the work vehicle 100 includes a plurality of sensors. The sensors include a plurality of cameras 120, a LiDAR sensor 140, and a plurality of obstacle sensors 130.

The cameras 120 can be provided at the front/rear/right/left of the work vehicle 100, for example. The cameras 120 image the environment around the work vehicle 100 and generate image data. The images acquired by the cameras 120 may be output to a processor installed on the work vehicle 100 and transmitted to the terminal 400 for remote monitoring. The images are used to obtain motion information of a person or persons present in the environment around the work vehicle 100. The images may also be used to monitor the work vehicle 100 during unmanned driving. The cameras 120 may also be used to generate images for recognizing surrounding objects or obstacles, white lines, signs, or indications when the work vehicle 100 travels on a road outside the field (an agricultural road or a general road).

The LiDAR sensor 140 in the example of FIG. 2 is disposed on a bottom portion of a front surface of the vehicle body 101. The LiDAR sensor 140 may be disposed at any other position. While the work vehicle 100 is traveling mainly outside the field, the LiDAR sensor 140 repeatedly outputs sensor data representing the distance and the direction to each measurement point of an object existing in the surrounding environment or the two-dimensional or three-dimensional coordinate values of each measurement point. The sensor data output from the LiDAR sensor 140 is processed by the controller of the work vehicle 100. The controller can perform localization of the work vehicle 100 by matching the sensor data against the environment map. The controller can further detect an object such as an obstacle existing around the work vehicle 100 based on the sensor data. The controller can also generate or edit the environment map using an algorithm such as, for example, SLAM (Simultaneous Localization and Mapping). The work vehicle 100 may include a plurality of LiDAR sensors disposed at different positions with different orientations.

The plurality of obstacle sensors 130 shown in FIG. 2 are provided at the front and the rear of the cabin 105. The obstacle sensors 130 may also be disposed at other positions. For example, one or more obstacle sensors 130 may be disposed at any position at the sides, the front or the rear of the vehicle body 101. The obstacle sensors 130 may include, for example, a laser scanner or an ultrasonic sonar. The obstacle sensors 130 are used to detect obstacles around the work vehicle 100 during self-travelling to cause the work vehicle 100 to halt or detour. The LiDAR sensor 140 may be used as one of the obstacle sensors 130.

The work vehicle 100 further includes a GNSS unit 110. The GNSS unit 110 includes a GNSS receiver. The GNSS receiver may include an antenna to receive a signal(s) from a GNSS satellite(s) and a processor to calculate the position of the work vehicle 100 based on the signal(s) received by the antenna. The GNSS unit 110 receives satellite signals transmitted from the plurality of GNSS satellites, and performs positioning based on the satellite signals. GNSS is the general term for satellite positioning systems such as GPS (Global Positioning System), QZSS (Quasi-Zenith Satellite System; e.g., MICHIBIKI), GLONASS, Galileo, and Bei-Dou. Although the GNSS unit 110 according to the present example embodiment is disposed above the cabin 105, it may be disposed at any other position.

The GNSS unit 110 may include an inertial measurement unit (IMU). Signals from the IMU can be used to complement position data. The IMU can measure a tilt or a small motion of the work vehicle 100. The data acquired by the IMU can be used to complement the position data based on the satellite signals, so as to improve the performance of positioning.

In addition to the positioning results from the GNSS unit 110, the controller of the work vehicle 100 may use sensing data acquired by sensors such as the cameras 120 or the LiDAR sensor 140 for positioning. In the case where objects serving as characteristic points exist in the environment that is traveled by the work vehicle 100, as in the case of an agricultural road, a forest road, a general road or an orchard, the position and the orientation of the work vehicle 100 can be estimated with a high accuracy based on data that is acquired by the cameras 120 or the LiDAR sensor 140 and on an environment map stored in the storage in advance. The data acquired by the cameras 120 or the LiDAR sensor 140 can be used to correct or complement the position data based on the satellite signal to identify the position of the work vehicle 100 with a higher accuracy.

The prime mover 102 may be a diesel engine, for example. Instead of a diesel engine, an electric motor may be used. The transmission device 103 can change the propulsion and the moving speed of the work vehicle 100 through a speed changing mechanism. The transmission device 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the steered wheels, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force to change the steering angle of the front wheels 104F. When automatic steering is performed, under the control of the controller disposed in the work vehicle 100, the steering angle is automatically adjusted by the power of the hydraulic device or the electric motor.

A linkage device 108 is provided at the rear of the vehicle body 101. The linkage device 108 includes, e.g., a three-point linkage (also referred to as a "three-point link" or a "three-point hitch"), a PTO (Power Take Off) shaft, a universal joint, and a communication cable. The linkage device 108 allows the implement 300 to be attached to, or detached from, the work vehicle 100. The linkage device 108 is able to raise or lower the three-point link with a hydraulic device, for example, thus changing the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement can be connected at the rear of the work vehicle 100.

Although the implement 300 shown in FIG. 2 is a rotary tiller, the implement 300 is not limited to a rotary tiller. For example, any arbitrary implement such as a seeder, a spreader, a transplanter, a mower, a rake, a baler, a harvester, a sprayer, or a harrow, can be connected to the work vehicle 100 for use.

The work vehicle 100 shown in FIG. 2 can be driven by human driving; alternatively, it may only support unmanned driving. In that case, elements which are only required for human driving, e.g., the cabin 105, the steering device 106, and the driver's seat 107 do not need to be provided in the work vehicle 100. An unmanned work vehicle 100 can travel via autonomous driving, or by remote operation by the user.

Figure 3:
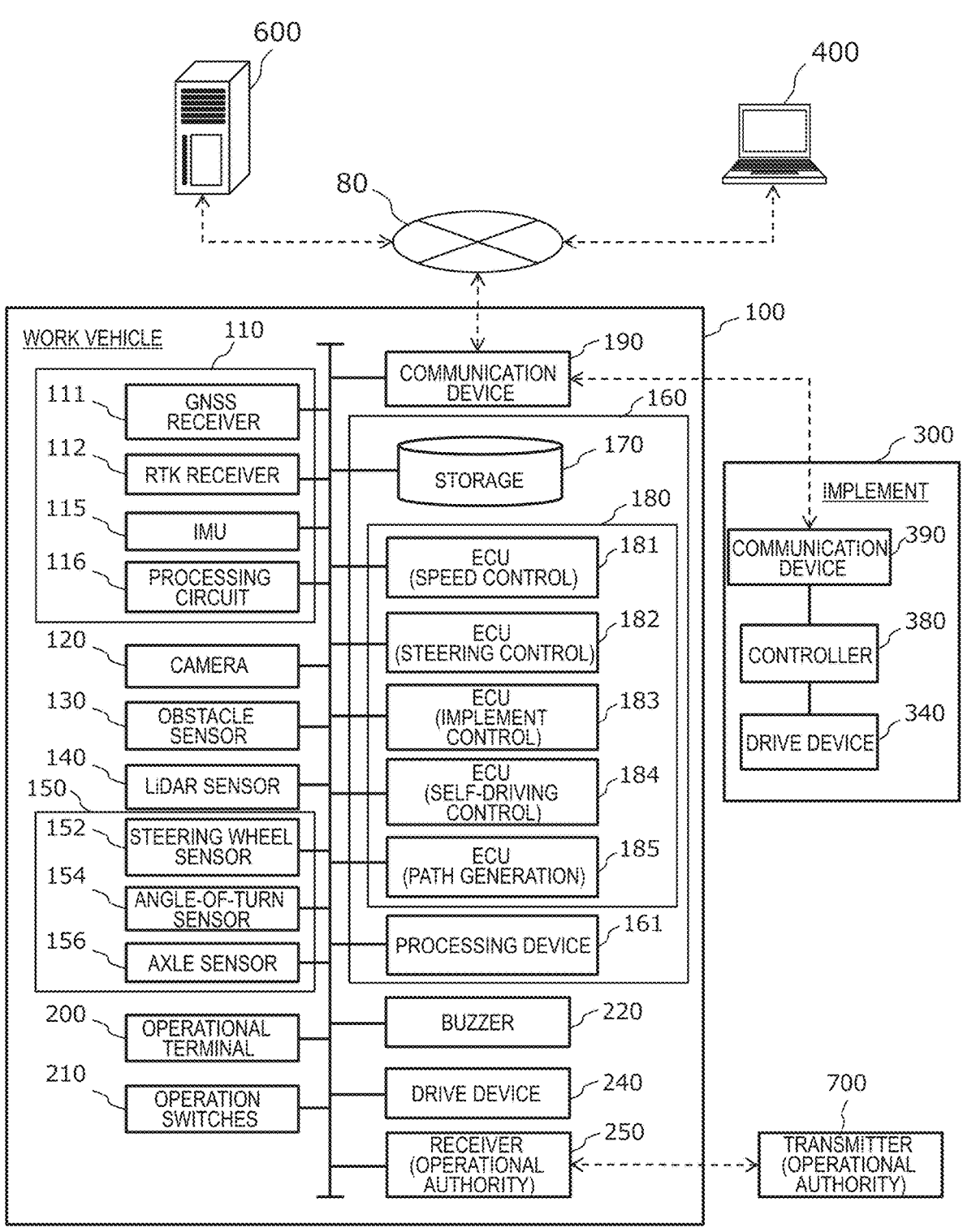
FIG. 3 is a block diagram showing an example configuration of the work vehicle and the implement.

FIG. 3 is a block diagram showing an example configuration of the work vehicle 100 and the implement 300. The work vehicle 100 and the implement 300 can communicate with each other via a communication cable that is included in the linkage device 108. The work vehicle 100 is able to communicate with the terminal 400 and the management device 600 via the network 80.

In addition to the GNSS unit 110, the cameras 120, the obstacle sensors 130, the LiDAR sensor 140 and an operational terminal 200, the work vehicle 100 in the example of FIG. 3 includes sensors 150 to detect the operating status of the work vehicle 100, a control system 160, a communication device 190, operation switches 210, a buzzer 220, and a drive device 240. These elements are communicably connected to each other via a bus. The GNSS unit 110 includes a GNSS receiver 111, an RTK receiver 112, an inertial measurement unit (IMU) 115, and a processing circuit 116. The sensors 150 include a steering wheel sensor 152, an angle-of-turn sensor 154, and an axle sensor 156. The control system 160 includes a processor 161, a storage 170, and a controller 180. The controller 180 includes a plurality of electronic control units (ECU) 181 to 185. The implement 300 includes a drive device 340, a controller 380, and a communication device 390. Note that FIG. 3 shows elements which are relatively closely related to the operations of self-driving by the work vehicle 100, while other elements are omitted from illustration.

The GNSS receiver 111 in the GNSS unit 110 receives satellite signals transmitted from the plurality of GNSS satellites and generates GNSS data based on the satellite signals. The GNSS data may be generated in a predetermined format such as, for example, the NMEA-0183 format. The GNSS data may include, for example, values representing the identification number, the angle of elevation, the azimuth angle, and the reception strength of each of the satellites from which the satellite signals are received.

Figure 4:
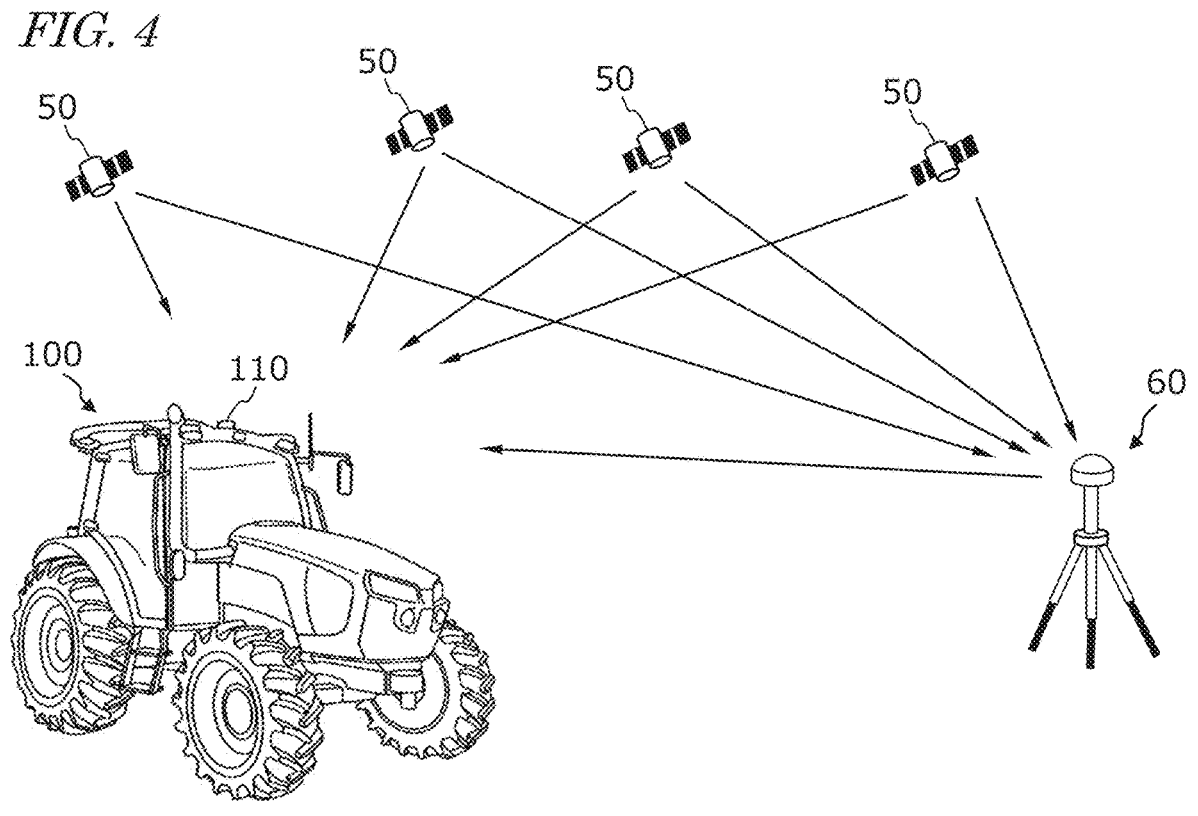
FIG. 4 is a conceptual diagram showing an example of the work vehicle performing positioning based on an RTK-GNSS.

The GNSS unit 110 shown in FIG. 3 performs positioning of the work vehicle 100 by utilizing an RTK (Real Time Kinematic)-GNSS. FIG. 4 is a conceptual diagram showing an example of the work vehicle 100 performing positioning based on the RTK-GNSS. In the positioning based on the RTK-GNSS, not only satellite signals transmitted from a plurality of GNSS satellites 50, but also a correction signal that is transmitted from a reference station 60 is used. The reference station 60 may be disposed near the field where the work vehicle 100 performs tasked travel (e.g., at a position within 10 km of the work vehicle 100). The reference station 60 generates a correction signal of, for example, an RTCM format based on the satellite signals received from the plurality of GNSS satellites 50, and transmits the correction signal to the GNSS unit 110. The RTK receiver 112, which includes an antenna and a modem, receives the correction signal transmitted from the reference station 60. Based on the correction signal, the processing circuit 116 of the GNSS unit 110 corrects the results of the positioning performed by the GNSS receiver 111. Use of the RTK-GNSS enables positioning with an accuracy on the order of several centimeters of errors, for example. Positional information including latitude, longitude, and altitude information is acquired through the highly accurate positioning by the RTK-GNSS. The GNSS unit 110 calculates the position of the work vehicle 100 as frequently as, for example, one to ten times per second.

Note that the positioning method is not limited to being performed by use of an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the GNSS unit 110 does not need to include the RTK receiver 112.

Even in the case where the RTK-GNSS is used, at a site where the correction signal from the reference station 60 cannot be acquired (e.g., on a road far from the field), the position of the work vehicle 100 is estimated by another method with no use of the signal from the RTK receiver 112. For example, the position of the work vehicle 100 may be estimated by matching the data output from the LiDAR sensor 140 and/or the cameras 120 against a highly accurate environment map.

The GNSS unit 110 according to the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the satellite signals and the correction signal but also on a signal that is output from the IMU 115, the processing circuit 116 can estimate the position and orientation of the work vehicle 100 with a higher accuracy. The signal that is output from the IMU 115 may be used to correct or complement the position that is calculated based on the satellite signals and the correction signal. The IMU 115 outputs a signal more frequently than the GNSS receiver 111. Utilizing this signal that is output highly frequently, the processing circuit 116 allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imaging devices that image the surrounding environment of the work vehicle 100. Each of the cameras 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the work vehicle 100, the cameras 120 image the surrounding environment of the work vehicle 100, and generate image data (e.g., motion picture data). The cameras 120 are able to capture motion pictures at a frame rate of 3 frames/second (fps: frames per second) or greater, for example. The images generated by the cameras 120 may be used when a remote supervisor checks the surrounding environment of the work vehicle 100 with the terminal 400, for example. The images generated by the cameras 120 may also be used for positioning or detection of obstacles. As shown in FIG. 2, the plurality of cameras 120 may be provided at different positions on the work vehicle 100, or a single camera may be provided. A visible camera(s) to generate visible light images and an infrared camera(s) to generate infrared images may be separately provided. Both of a visible camera(s) and an infrared camera(s) may be provided as cameras for generating images for monitoring purposes. The infrared camera(s) may also be used for detection of obstacles at nighttime.

The obstacle sensors 130 detect objects existing around the work vehicle 100. Each of the obstacle sensors 130 may include a laser scanner or an ultrasonic sonar, for example. When an object exists within a predetermined distance from an obstacle sensor 130, the obstacle sensor 130 outputs a signal indicating the presence of the obstacle. The plurality of obstacle sensors 130 may be provided at different positions on the work vehicle 100. For example, a plurality of laser scanners and a plurality of ultrasonic sonars may be disposed at different positions on the work vehicle 100. Providing such a great number of obstacle sensors 130 can reduce blind spots in monitoring obstacles around the work vehicle 100.

The steering wheel sensor 152 measures the angle of rotation of the steering wheel of the work vehicle 100. The angle-of-turn sensor 154 measures the angle of turn of the front wheels 104F, which are the steered wheels. Measurement values by the steering wheel sensor 152 and the angle-of-turn sensor 154 are used for steering control by the controller 180.

The axle sensor 156 measures the rotational speed, i.e., the number of revolutions per unit time, of an axle that is connected to the wheels 104. The axle sensor 156 may be a sensor utilizing a magnetoresistive element (MR), a Hall element, or an electromagnetic pickup, for example. The axle sensor 156 outputs a numerical value indicating the number of revolutions per minute (unit: rpm) of the axle, for example. The axle sensor 156 is used to measure the speed of the work vehicle 100.

The drive device 240 includes various types of devices required to cause the work vehicle 100 to travel and to drive the implement 300; for example, the prime mover 102, the transmission device 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The buzzer 220 is an audio output device to give an alarm sound to alert of an abnormality. For example, the buzzer

220 may give an alarm sound when an obstacle is detected during self-driving. The buzzer 220 is controlled by the controller 180.

An example of the processor 161 is a microprocessor or a microcontroller. The processor 161 may be configured or programmed to process sensing data output from sensors such as the cameras 120 and the LiDAR sensor 140. For example, when a camera 120 captures a person in the environment around the work vehicle 100, the processor 161 can determine the type of gesture performed by the person based on the image data acquired by the camera 120 or can recognize a particular person using image recognition technology.

The storage 170 includes one or more storage mediums such as a flash memory or a magnetic disc. The storage 170 stores various data that is generated by the GNSS unit 110, the cameras 120, the obstacle sensors 130, the LiDAR sensor 140, the sensors 150, and the controller 180. The data that is stored by the storage 170 may include map data (an environment map) on the environment where the work vehicle 100 travels and data of a target path for self-driving. The environment map includes information on a plurality of fields where the work vehicle 100 performs agricultural work and roads around the fields. The environment map and the target path may be generated by a processor in the management device 600. Note that the controller 180 may have a function of generating or editing the environment map and the target path. The controller 180 can edit the environment map and the target path acquired from the management device 600 in accordance with the environment where the work vehicle 100 travels. The storage 170 also stores data on a work plan received by the communication device 190 from the management device 600.

The storage 170 also stores a computer program(s) to cause the processor 161 and each of the ECUs in the controller 180 to perform various operations described below. Such a computer program(s) may be provided to the work vehicle 100 via a storage medium (e.g., a semiconductor memory or an optical disc, etc.) or through telecommunication lines (e.g., the Internet). Such a computer program(s) may be marketed as commercial software.

The controller 180 includes the plurality of ECUs. The plurality of ECUs include, for example, the ECU 181 for speed control, the ECU 182 for steering control, the ECU 183 for implement control, the ECU 184 for self-driving control, and the ECU 185 for path generation.

The ECU 181 controls the prime mover 102, the transmission device 103 and brakes included in the drive device 240, thus controlling the speed of the work vehicle 100.

The ECU 182 controls the hydraulic device or the electric motor included in the steering device 106 based on a measurement value of the steering wheel sensor 152, thus controlling the steering of the work vehicle 100.

In order to cause the implement 300 to perform a desired operation, the ECU 183 controls the operations of the three-point link, the PTO shaft and the like that are included in the linkage device 108. Also, the ECU 183 generates a signal to control the operation of the implement 300, and transmits this signal from the communication device 190 to the implement 300.

Based on data output from the GNSS unit 110, the cameras 120, the obstacle sensors 130, the LiDAR sensor 140, the sensors 150, and the processor 161, the ECU 184 performs computation and control to achieve self-driving. For example, the ECU 184 specifies the position of the work vehicle 100 based on the data output from at least one of the GNSS unit 110, the cameras 120, and the LiDAR sensor 140. Inside the field, the ECU 184 may determine the position of the work vehicle 100 based only on the data output from the GNSS unit 110. The ECU 184 may estimate or correct the position of the work vehicle 100 based on data acquired by the cameras 120 or the LiDAR sensor 140. Use of the data acquired by the cameras 120 or the LiDAR sensor 140 allows the accuracy of the positioning to be further improved. Outside the field, the ECU 184 estimates the position of the work vehicle 100 by use of the data output from the LiDAR sensor 140 or the cameras 120. For example, the ECU 184 may estimate the position of the work vehicle 100 by matching the data output from the LiDAR sensor 140 or the cameras 120 against the environment map. During self-driving, the ECU 184 performs computation necessary for the work vehicle 100 to travel along a target path based on the estimated position of the work vehicle 100. The ECU 184 sends a command to change the speed to the ECU 181 and a command to change the steering angle to the ECU 182. The ECU 181 changes the speed of the work vehicle 100 by controlling the prime mover 102, the transmission device 103, or brakes, in response to the speed change command. The ECU 182 changes the steering angle by controlling the steering device 106 in response to the command to change the steering angle.

The ECU 185 recognizes obstacles present around the work vehicle 100 based on data output from the cameras 120, the obstacle sensors 130, and the LiDAR sensor 140 while the work vehicle 100 is traveling. The ECU 185 can also determine the destination of the work vehicle 100 based on the work plan stored in the storage 170, and can determine a target path from the starting point to the destination point of the movement of the work vehicle 100.

Through the actions of these ECUs, the controller 180 realizes self-driving. During self-driving, the controller 180 controls the drive device 240 based on the measured or estimated position of the work vehicle 100 and the target path. As a result, the controller 180 can be configured or programmed to cause the work vehicle 100 to travel along the target path. Also, the controller 180 is configured or programmed to cause the work vehicle 100 or the implement 300 to perform an operation that is determined according to the type of a gesture performed by a person in the environment around the work vehicle 100 and the operational authority granted to the person. The plurality of ECUs included in the controller 180 can cooperate together to perform these processes. The types of gestures and the operational authority will be described in more detail below.

The plurality of ECUs included in the controller 180 can communicate with each other in accordance with a vehicle bus standard such as, for example, a CAN (Controller Area Network). Instead of the CAN, faster communication methods such as Automotive Ethernet (registered trademark) may be used. Although the ECUs 181 to 185 are illustrated as individual blocks in FIG. 3, each of these functions may be implemented by a plurality of ECUs. An onboard computer that integrates the functions of at least some of the ECUs 181 to 185 may be provided. The controller 180 may include ECUs other than the ECUs 181 to 185, and any number of ECUs may be provided in accordance with functionality. Each ECU includes a processing circuit including one or more processors.

The communication device 190 is a device including a circuit communicating with the implement 300, the terminal 400, and the management device 600. The communication device 190 includes circuitry to perform exchanges of signals complying with an ISOBUS standard such as ISO-BUS-TIM, for example, between itself and the communication device 390 of the implement 300. This allows the implement 300 to perform a desired operation, or allows information to be acquired from the implement 300. The communication device 190 may further include an antenna and a communication circuit to exchange signals via the network 80 with communication devices of the terminal 400, and the management device 600. The network 80 may include a 3G, 4G, 5G, or any other cellular mobile communications network and the Internet, for example. The communication device 190 may have a function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform an operation related to the travel of the work vehicle 100 and the operation of the implement 300, and is also referred to as a virtual terminal (VT). The operational terminal 200 may include a display device such as a touch screen, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, recording or editing an environment map, setting a target path, and switching ON/OFF the implement 300. At least a portion of these manipulations may also be realized by manipulating the operation switches 210. The operational terminal 200 may be configured so as to be detachable from the work vehicle 100. A user who is at a remote place from the work vehicle 100 may manipulate the detached operational terminal 200 to control the operation of the work vehicle 100. Instead of the operational terminal 200, the user may manipulate a computer on which necessary application software is installed, for example, the terminal 400, to control the operation of the work vehicle 100.

Figure 5:
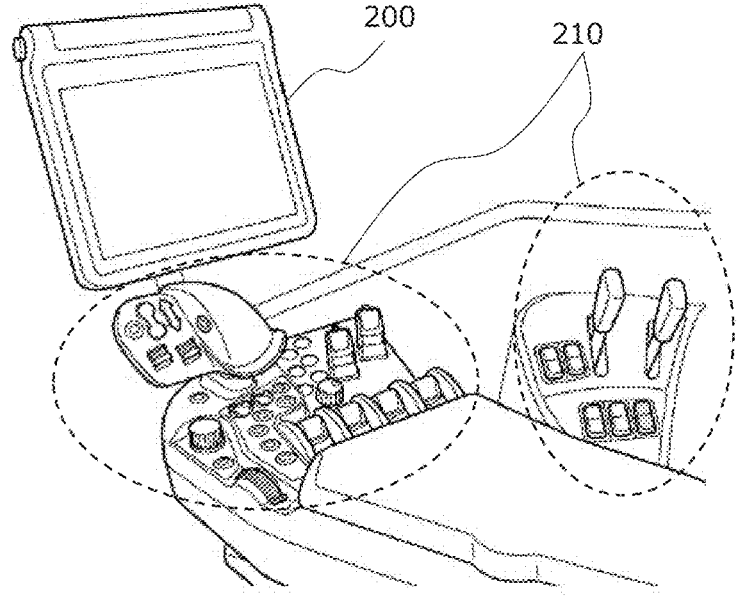
FIG. 5 is a diagram showing an example of operational terminal and an example of operation switches disposed in a cabin.

FIG. 5 is a diagram showing an example of the operational terminal 200 and an example of the operation switches 210 provided in the cabin 105. In the cabin 105, the operation switches 210, including a plurality of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving and lacks human driving functionality, the work vehicle 100 does not need to include the operation switches 210.

The work vehicle 100 shown in FIG. 3 further includes a receiver 250. The receiver 250 is used to communicate with a transmitter 700 carried by a person present in the environment around the work vehicle 100. The receiver 250 and the transmitter 700 will be described in more detail below.

The drive device 340 in the implement 300 shown in FIG. 3 performs operations necessary for the implement 300 to perform predetermined work. The drive device 340 includes a device suitable for uses of the implement 300, for example, a hydraulic device, an electric motor, a pump or the like. The controller 380 controls the operation of the drive device 340. In response to a signal that is transmitted from the work vehicle 100 via the communication device 390, the controller 380 causes the drive device 340 to perform various operations. Moreover, a signal that is in accordance with the state of the implement 300 may be transmitted from the communication device 390 to the work vehicle 100.

Figure 6:
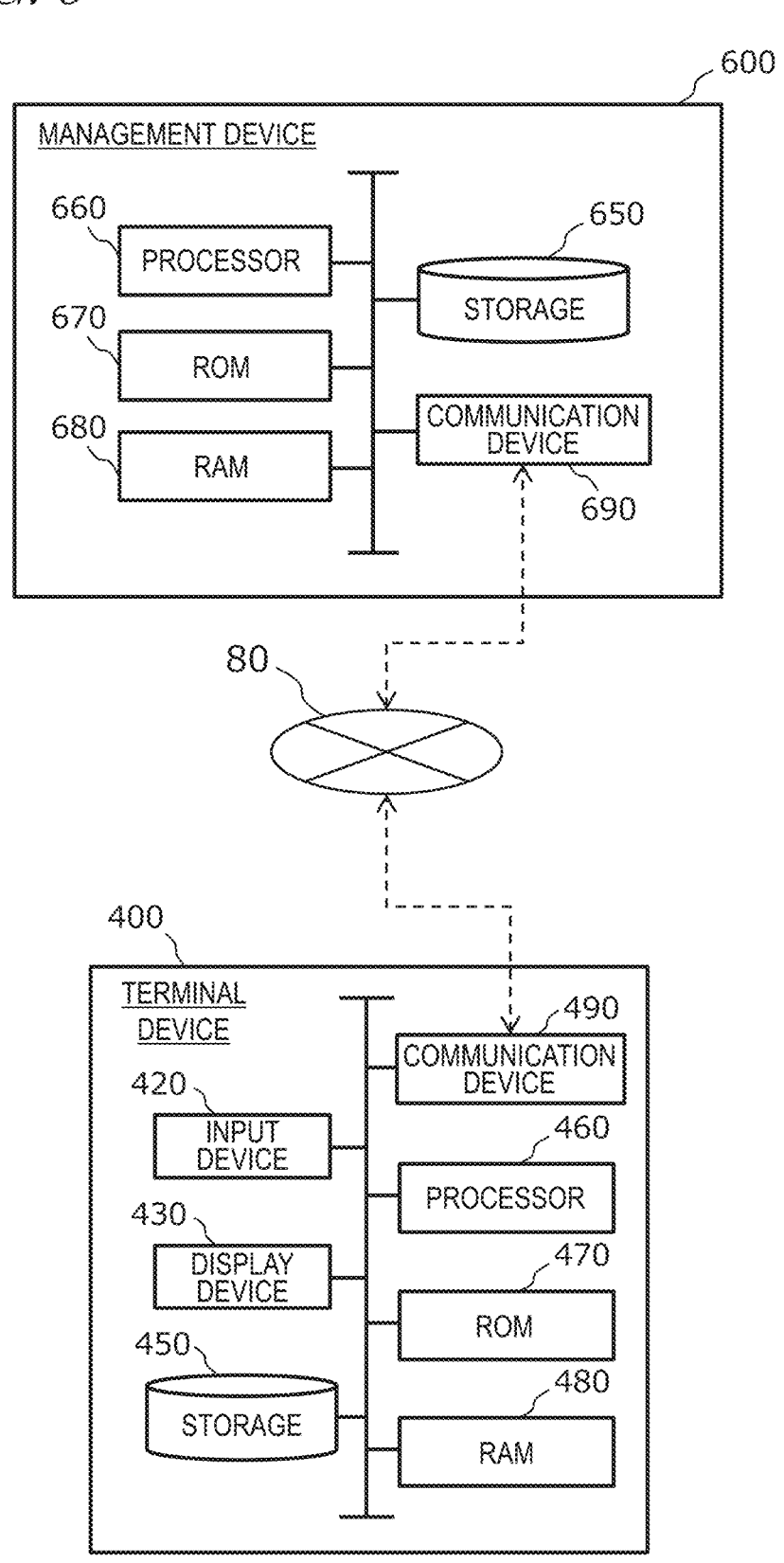
FIG. 6 is a block diagram showing an example hardware configuration of a management device and a terminal.

Next, referring to FIG. 6, a configuration of the management device 600 and the terminal 400 will be described. FIG. 6 is a block diagram showing an example of schematic hardware configuration of the management device 600 and the terminal 400.

The management device 600 includes a storage 650, a processor 660, a ROM (Read Only Memory) 670, a RAM (Random Access Memory) 680, and a communication device 690. These elements are communicably connected to each other via a bus. The management device 600 may function as a cloud server to manage the schedule of the agricultural work to be performed by the work vehicle 100 in a field and support agriculture by use of the data managed by the management device 600. The user can input information necessary to create a work plan by use of the terminal 400 and upload the information to the management device 600 via the network 80. The management device 600 can create a schedule of agricultural work, that is, a work plan based on the information. The management device 600 can further generate or edit an environment map. The environment map may be distributed from a computer external to the management device 600.

The communication device 690 is a communication module to communicate with the work vehicle 100 and the terminal 400 via the network 80. The communication device 690 can perform wired communication in compliance with communication standards such as, for example, IEEE1394 (registered trademark) or Ethernet (registered trademark). The communication device 690 may perform wireless communication in compliance with Bluetooth (registered trademark) or Wi-Fi, or cellular mobile communication such as 3G, 4G or 5G.

The processor 660 may be, for example, a semiconductor integrated circuit including a central processing unit (CPU). The processor 660 may be realized by a microprocessor or a microcontroller. Alternatively, the processor 660 may be realized by an FPGA (Field Programmable Gate Array), a GPU (Graphics Processing Unit), an ASIC (Application Specific Integrated Circuit), an ASSP (Application Specific Standard Product), carrying a CPU, or a combination of two or more selected from these circuits. The processor 660 consecutively executes a computer program, describing commands to execute at least one process, stored in the ROM 670 and thus realizes a desired process.

The ROM 670 is, for example, a writable memory (e.g., PROM), a rewritable memory (e.g., flash memory) or a read-only memory. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of boot. The RAM 680 does not need to be a single storage medium, and may be an assembly of a plurality of storage mediums.

The storage 650 mainly functions as a storage for a database. The storage 650 may be, for example, a magnetic storage or a semiconductor storage. An example of the magnetic storage is a hard disc drive (HDD). An example of the semiconductor storage is a solid state drive (SSD). The storage 650 may be independent from the management device 600. For example, the storage 650 may be connected to the management device 600 via the network 80, for example, a cloud storage.

The terminal 400 includes an input device 420, a display device 430, a storage 450, a processor 460, a ROM 470, a RAM 480, and a communication device 490. These elements are communicably connected to each other via a bus. The input device 420 is a device to convert an instruction from the user into data and input the data to a computer. The input device 420 may be, for example, a keyboard, a mouse or a touch panel. The display device 430 may be, for example, a liquid crystal display or an organic EL display. The processor 460, the ROM 470, the RAM 480, the storage 450 and the communication device 490 are substantially the same as those described above regarding the example of the hardware configuration of the management device 600, and will not be described in repetition.

Next, an operation of the work vehicle 100, the terminal 400, and the management device 600 will be described.

First, an example operation of self-traveling of the work vehicle 100 will be described. The work vehicle 100 according to the present example embodiment can automatically travel both inside the field and outside the field. Inside the field, the work vehicle 100 drives the implement 300 to perform predetermined agricultural work while traveling along a predetermined target path. When an obstacle is detected by the obstacle sensors 130 while the work vehicle 100 is traveling inside the field, the work vehicle 100 halts traveling, performs operations of giving an alarm sound from the buzzer 220, and sending an alarm signal to the terminal 400. Inside the field, the positioning of the work vehicle 100 is performed based mainly on the data output from the GNSS unit 110. Meanwhile, outside the field, the work vehicle 100 automatically travels along a target path set for an agricultural road or a general road outside the field. While traveling outside the field, the work vehicle 100 travels while utilizing the data acquired by the cameras 120 or the LiDAR sensor 140. When an obstacle is detected outside the field, the work vehicle 100 avoids the obstacle or halts at the point. Outside the field, the position of the work vehicle 100 is estimated based on the data output from the LiDAR sensor 140 or the cameras 120 in addition to the positioning data output from the GNSS unit 110.

An example operation of the work vehicle 100 performing self-traveling inside the field will be described.

Figure 7:
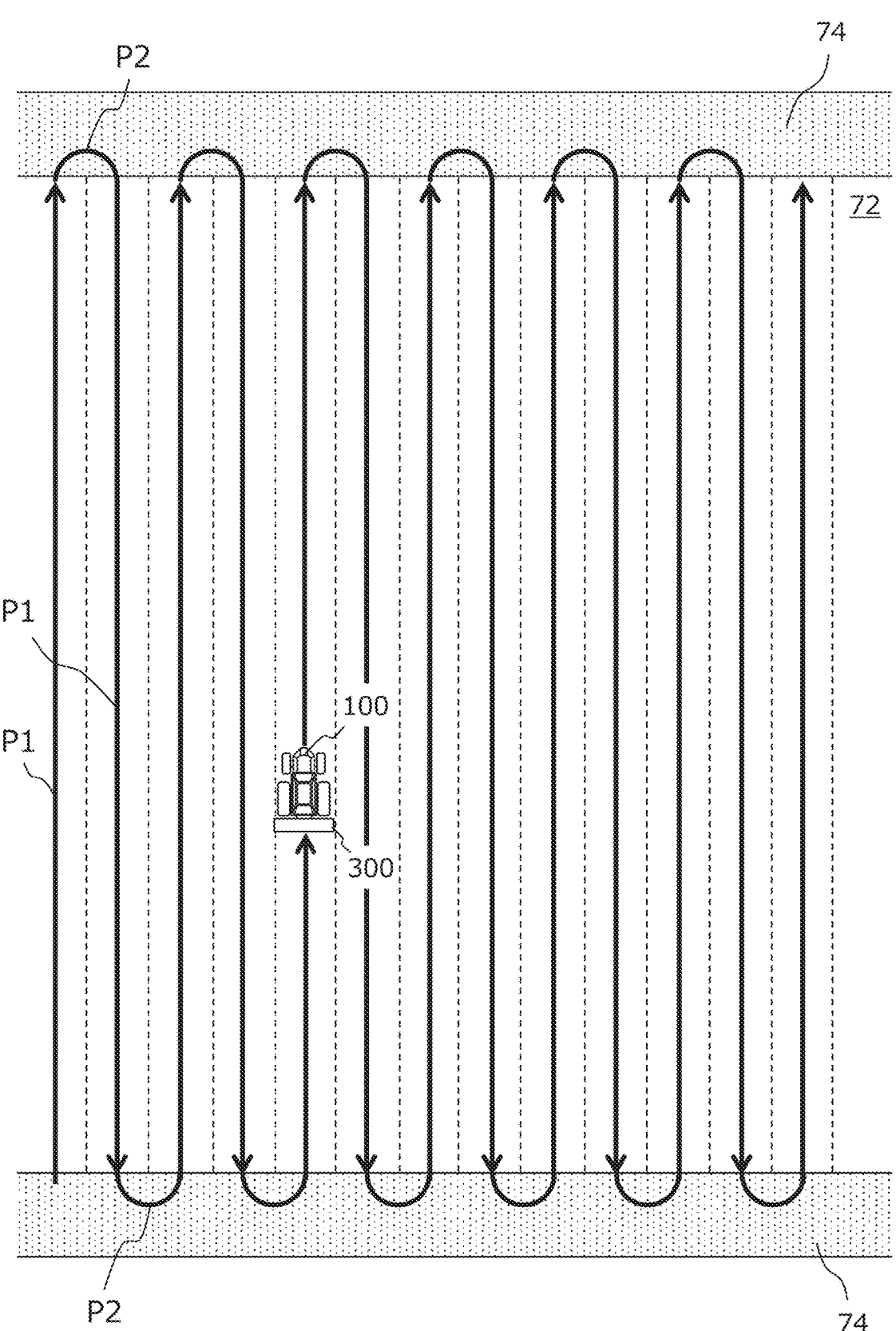
FIG. 7 is a diagram schematically showing an example of the work vehicle automatically traveling along a target path inside a field.

FIG. 7 is a diagram schematically showing an example of the work vehicle 100 automatically traveling along a target path in a field. In this example, the field includes a work area 72, in which the work vehicle 100 performs work by using the implement 300, and headlands 74, which are located near outer edges of the field. The user may specify, in advance, which regions of the field would correspond to the work area 72 and the headlands 74 on the map. The target path in this example includes a plurality of main paths P1 parallel to each other and a plurality of turning paths P2 interconnecting the plurality of main paths P1. The main paths P1 are located in the work area 72, whereas the turning paths P2 are located in the headlands 74. Although each of the main paths P1 shown in FIG. 7 is a linear path, each main path P1 may also include a curved portion(s). Broken lines in FIG. 7 depict the working breadth of the implement 300. The working breadth is previously set and recorded in the storage 170. The working breadth may be set and recorded by the user manipulating the operational terminal 200 or the terminal 400. Alternatively, the working breadth may be automatically recognized and recorded when the implement 300 is connected to the work vehicle 100. The interval between the plurality of main paths P1 may be set so as to be matched to the working breadth. The target path may be generated based on the operation by the user, before self-driving is begun. The target path may be generated so as to cover the entire work area 72 in the field, for example. Along the target path shown in FIG. 7, the work vehicle 100 automatically travels while repeatedly reciprocating from a beginning point of work to an ending point of work. Note that the target path shown in FIG. 7 is merely an example, and the target path may be arbitrarily determined.

Next, an example control by the controller 180 during self-driving inside the field will be described.

Figure 8:
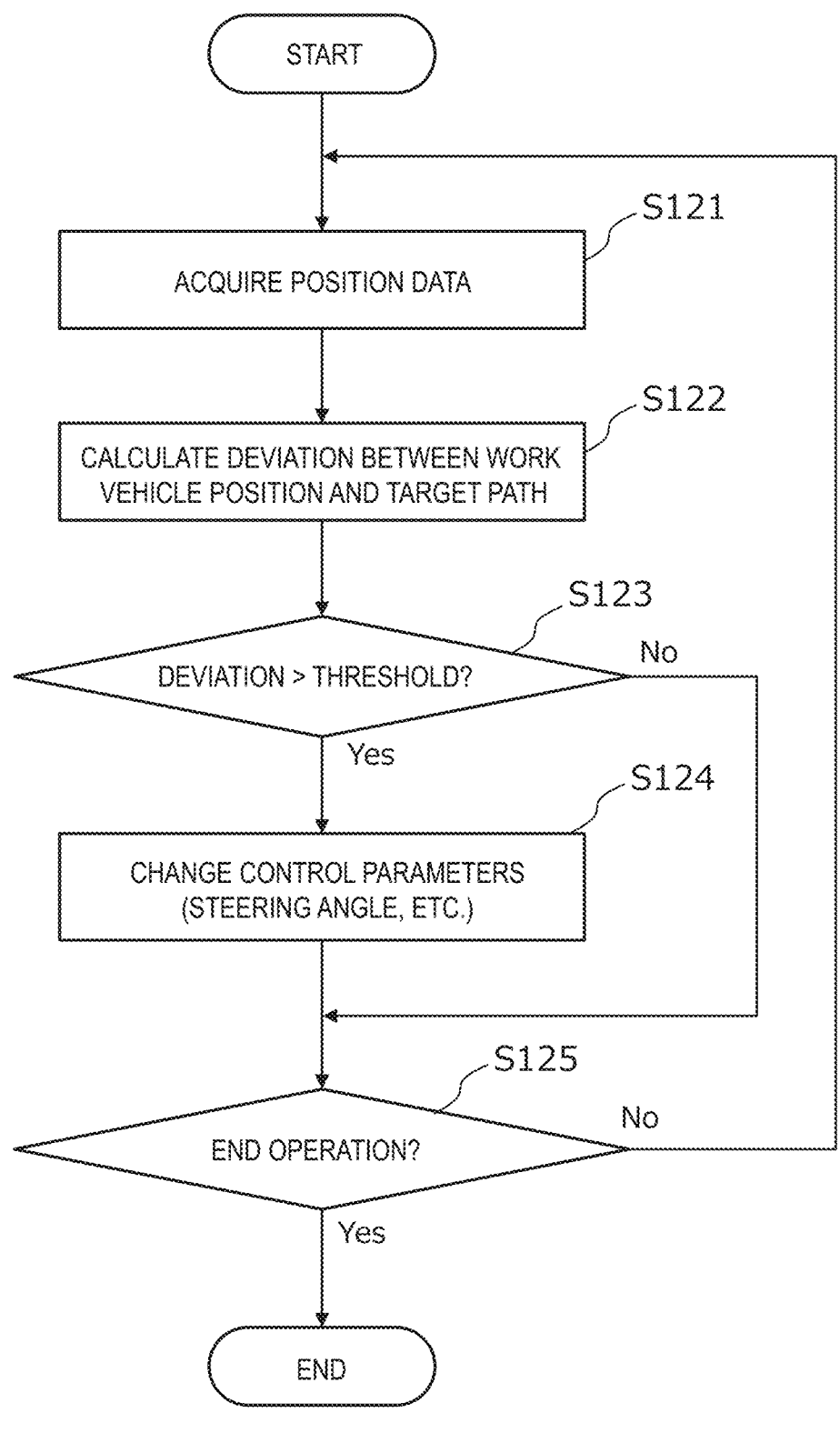
FIG. 8 is a flowchart showing an example operation of steering control during self-driving.

FIG. 8 is a flowchart showing an example operation of steering control to be performed by the controller 180 during self-driving. During travel of the work vehicle 100, the controller 180 is configured or programmed to perform automatic steering by performing the operation from steps S121 to S125 shown in FIG. 8. The speed of the work vehicle 100 will be maintained at a previously-set speed, for example. During travel of the work vehicle 100, the controller 180 acquires data representing the position of the work vehicle 100 that is generated by the GNSS unit 110 (step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the previously-set threshold or not (step S123). If the deviation exceeds the threshold, the controller 180 changes a control parameter of the steering device included in the drive device 240 so as to reduce the deviation, thus changing the steering angle. If the deviation does not exceed the threshold at step S123, the operation of step S124 is omitted. At the following step S125, the controller 180 determines whether a command to end the operation has been received or not. The command to end the operation may be given when the user has instructed that self-driving be suspended through remote operations, or when the work vehicle 100 has arrived at the destination, for example. If the command to end the operation has not been given, the control returns to step S121, and substantially the same operation is performed based on a newly measured position of the work vehicle 100. The controller 180 repeats the operation from steps S121 to S125 until a command to end the operation is given. The aforementioned operation is executed by the ECUs 182 and 184 in the controller 180.

In the example shown in FIG. 8, the controller 180 controls the drive device 240 based only on the deviation between the position of the work vehicle 100 as identified by the positioning device 110 and the target path, but a directional deviation may further be considered in the control. For example, when the directional deviation exceeds a previously-set threshold, where the directional deviation is an angle difference between the orientation of the work vehicle 100 as identified by the GNSS unit 110 and the direction of the target path, the controller 180 may change the control parameter of the steering device of the drive device 240 (e.g., steering angle) in accordance with the deviation.

Hereinafter, with reference to FIGS. 9A to 9D, an example of steering control by the controller 180 will be described more specifically.

FIG. 9A is a diagram showing an example of the work vehicle 100 traveling along a target path P. FIG. 9B is a diagram showing an example of the work vehicle 100 at a position which is shifted rightward from the target path P. FIG. 9C is a diagram showing an example of the work vehicle 100 at a position which is shifted leftward from the target path P. FIG. 9D is a diagram showing an example of the work vehicle 100 oriented in an inclined direction with respect to the target path P. In these figures, the pose, representing the position and orientation, of the work vehicle 100 as measured by the GNSS unit 110 is expressed as r(x, y, θ). (x, y) are coordinates representing the position of a reference point on the work vehicle 100 in an XY coordinate system, which is a two-dimensional coordinate system fixed to the globe. In the examples shown in FIGS. 9A to 9D, the reference point on the work vehicle 100 is at a position, on the cabin, where a GNSS antenna is disposed, but the reference point may be at any arbitrary position. θ is an angle representing the measured orientation of the work vehicle 100. Although the target path P is parallel to the Y axis in the illustrated examples, the target path P may not necessarily be parallel to the Y axis, in general.

As shown in FIG. 9A, in the case where the position and orientation of the work vehicle 100 are not deviated from the target path P, the controller 180 maintains the steering angle and speed of the work vehicle 100 without changing them.

As shown in FIG. 9B, when the position of the work vehicle 100 is shifted rightward from the target path P, the controller 180 changes the steering angle so that the traveling direction of the work vehicle 100 will be inclined leftward, thus bringing the work vehicle 100 closer to the path P. Herein, not only the steering angle but also the speed may be changed. The magnitude of the steering angle may be adjusted in accordance with the magnitude of a positional deviation Δx, for example.

As shown in FIG. 9C, when the position of the work vehicle 100 is shifted leftward from the target path P, the controller 180 changes the steering angle so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation Δx, for example.

As shown in FIG. 9D, in the case where the position of the work vehicle 100 is not considerably deviated from the target path P but its orientation is different from the direction of the target path P, the controller 180 changes the steering angle so that the directional deviation Δθ will become smaller. In this case, too, not only the steering angle but also the speed may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order to return to the path P, so that the directional deviation Δθ will inevitably have a large absolute value. Conversely, when the positional deviation Δx has a small absolute value, the directional deviation Δθ needs to become closer to zero. Therefore, it may be advantageous to introduce a relatively large weight (i.e., control gain) for the directional deviation Δθ for determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 during travel, the controller 180 halts the work vehicle 100. In such a case, the buzzer 220 may give an alarm sound or send an alarm signal to the terminal 400. When it is possible to avoid the obstacle, the controller 180 may control the drive device 240 so as to avoid the obstacle.

The work vehicle 100 according to the present example embodiment can perform self-traveling outside a field as well as inside the field. Based on the data output from the cameras 120 or the LiDAR sensor 140, the controller 180 is able to detect an object located at a relatively distant position from the work vehicle 100 (e.g., another vehicle, a pedestrian, etc.). By performing the speed control and steering control so as to avoid the detected object, the controller 180 can achieve self-traveling on a road outside the field.

Figure 10:
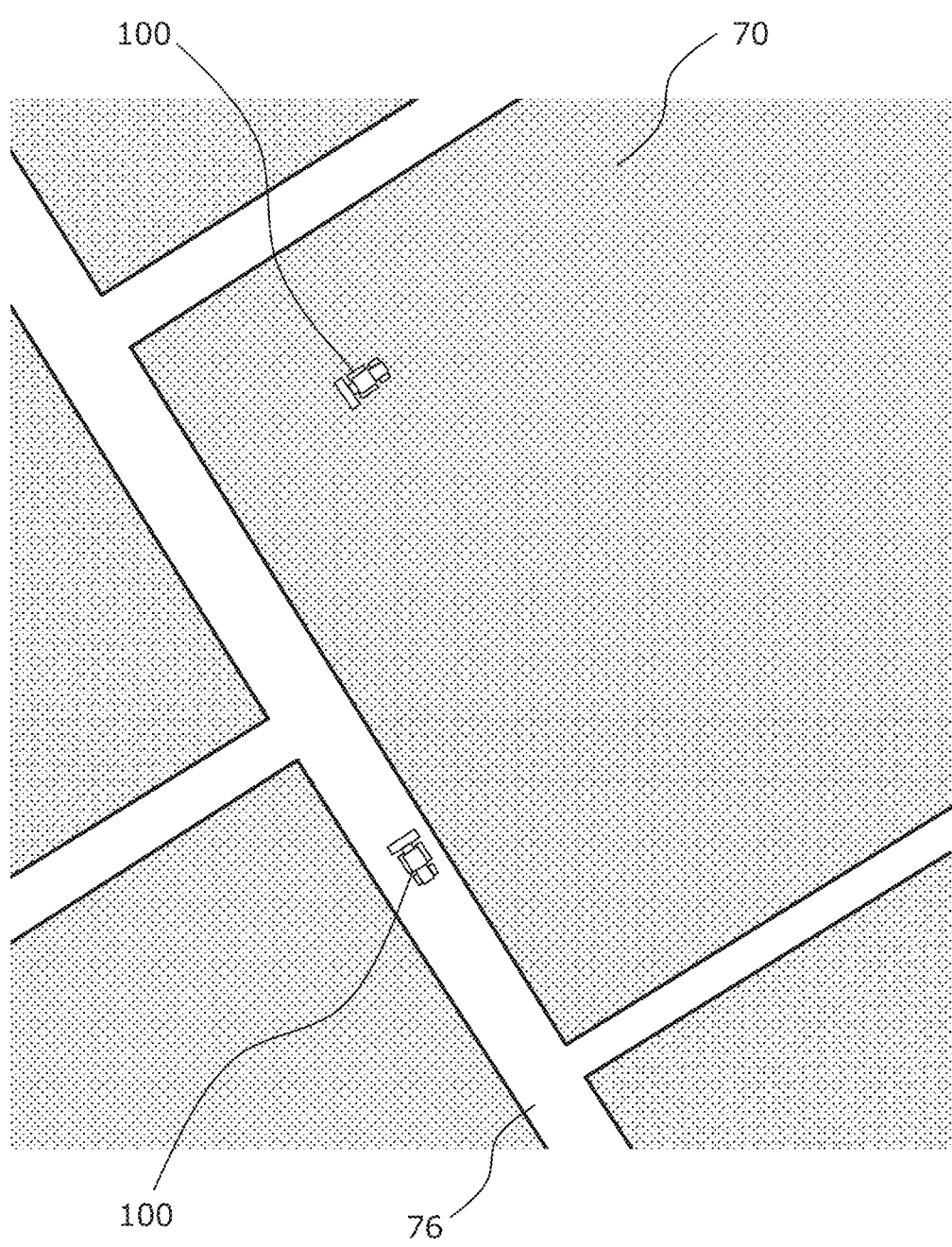
FIG. 10 is a diagram schematically showing an example of state where a plurality of the work vehicles perform self-traveling inside a field and on a road outside the field.

The work vehicle 100 according to the present example embodiment can automatically travel inside the field and outside the field in an unmanned manner. FIG. 10 is a diagram schematically showing an example of state where a plurality of work vehicles 100 are performing self-traveling inside a field 70 and on a road 76 outside the field 70. Information on the environment map and the target path for an area including a plurality of fields and roads around the fields is recorded in the storage 170. The environment map and the target path may be generated by the management device 600 and the ECU 185. In the case where the work vehicle 100 travels on a road, the work vehicle 100 travels along the target path while sensing the surroundings thereof by use of the sensors such as the cameras 120 and the LiDAR sensor 140, with the implement 300 being raised.

When a person in the environment around the work vehicle 100 is performing a specific gesture, the work vehicle 100 or the implement 300 (hereinafter referred to also as "agricultural machine") performs a desired action according to the type of gesture and the operational authority granted to the person. Herein, a person means an agricultural worker mainly generally involved in agricultural work, including, for example, an agricultural business executive, an owner of an agricultural machine, a manager who manages a field, and a worker who performs agricultural work in the field. A person can instruct an agricultural machine to perform an action by performing a gesture from a distance from the agricultural machine. In the following description, operating an agricultural machine by a gesture from a distance from the machine is called "remote operation". The types of actions that can be instructed to agricultural machines vary depending on the presence/absence of operational authority or the level of operational authority. For example, a worker performing agricultural work in the field can bring an agricultural machine to an emergency stop by performing an action of momentarily crossing both arms in front toward the agricultural machine in the case of an emergency. Since the worker can perform a gesture, instead of remotely operating the terminal, for example, it is possible to improve the convenience of operating a self-traveling agricultural machine from a remote location.

The controller 180 included in the work vehicle 100 of the present example embodiment is configured to, when the at least one sensor acquires motion information of a person performing a gesture in the environment around the agricultural machine, cause the agricultural machine to perform an action determined based on the type of gesture and the operational authority granted to the person. In the present example embodiment, the processor 161 included in the work vehicle 100 determines the action to be performed by the agricultural machine based on the type of gesture and the operational authority granted to the person. However, the determination of this action may be performed by the management device 600, for example, or by a dedicated computer connected to the network 80 that performs the determination of this action. The controller 180 causes the agricultural machine to perform the action determined according to the type of gesture and the level of operational authority.

Hereinafter, a camera is taken as an example of a sensor to acquire motion information of a person. One or more cameras 120 installed on the work vehicle 100 capture an image of a person performing a gesture and acquire image data (or sensing data) including motion information of the person. Note, however, that the sensor that acquires motion information of the person is not limited to a camera and may be, for example, a LiDAR sensor. The LiDAR sensor generates, for example, a group of data representing changes over time of a group of points of the person performing the gesture or the distance distribution thereof, thereby acquiring motion information of the person. In this case, the processor 161 can process the group of data output from the at least one LiDAR sensor 140, for example, to perform object recognition or gesture recognition as described below.

An operational authority is granted to a person, such as an agricultural business executive, an owner of an agricultural machine, a manager or a worker. The operational authority includes a plurality of levels with different actions or different groups of actions to be performed by the agricultural machine. The higher the level of operational authority, the more types of actions can be performed by the agricultural machine through remote operation. The types of actions will be explained in detail later. In one example embodiment, the operational authority may include a first operational authority, a second operational authority with a higher level of authority than the first operational authority, and a third operational authority with a higher level of authority than the second operational authority. The operational authority may further include a plurality of authority levels. For example, the first operational authority is assigned the "low" level and the second operational authority is assigned the "high" level. Alternatively, the first operational authority is assigned the "low" level, the second operational authority is assigned the "high" level, and the third operational authority is assigned the "highest" level. In another example embodiment, the first operational authority is assigned "unauthorized", and the second operational authority is assigned "authorized". The level of authority in this example is distinguished by the presence/absence of authority. In this case, only a person or persons to whom operational authority should be granted may be granted operational authority.

As an example of granting operational authority, an agricultural business executive or manager is granted a second operational authority of the "high" level or "authorized", and a worker is granted a first operational authority of the "low" level or "unauthorized". Alternatively, an agricultural business executive or manager may be granted a third operational authority, which is the "highest" level, an owner of an agricultural machine may be granted a second operational authority, which is the "high" level, and a worker may be granted a first operational authority, which is the "low" level. The granting or setting of operational authority can be done, for example, using a VT, the terminal 400, a beacon terminal or an RFID (Radio Frequency IDentification) terminal. The setting of operational authority will be described in detail below.

A person can remotely operate an agricultural machine according to the type of gesture performed by the person and the operational authority granted to the person. For example, the remote operation includes an operation to stop or decelerate a running agricultural machine, an operation to resume travel of a stopped agricultural machine, an operation to stop a prime mover of a stopped agricultural machine, an operation to control an action to be performed by an implement, an operation to cause an agricultural machine to move out of the field, and an operation to an action to be performed by an agricultural machine being outside the field.

With the work vehicle 100 of the present example embodiment, a plurality of cameras 120 are provided at different locations on the work vehicle 100. As illustrated in FIG. 2, it is preferred that four cameras 120 are provided at four locations on the front, rear, right and left sides of the roof located above the cabin 105. The four cameras 120 capture images of the environment forward, rearward, rightward and leftward of the work vehicle 100, respectively. Thus, it is possible to capture images of persons in the environment around the work vehicle 100 from all directions. Note, however, that the number of cameras is arbitrary and the locations in which they are installed are not limited to the locations shown in the figure.

Figure 11A:
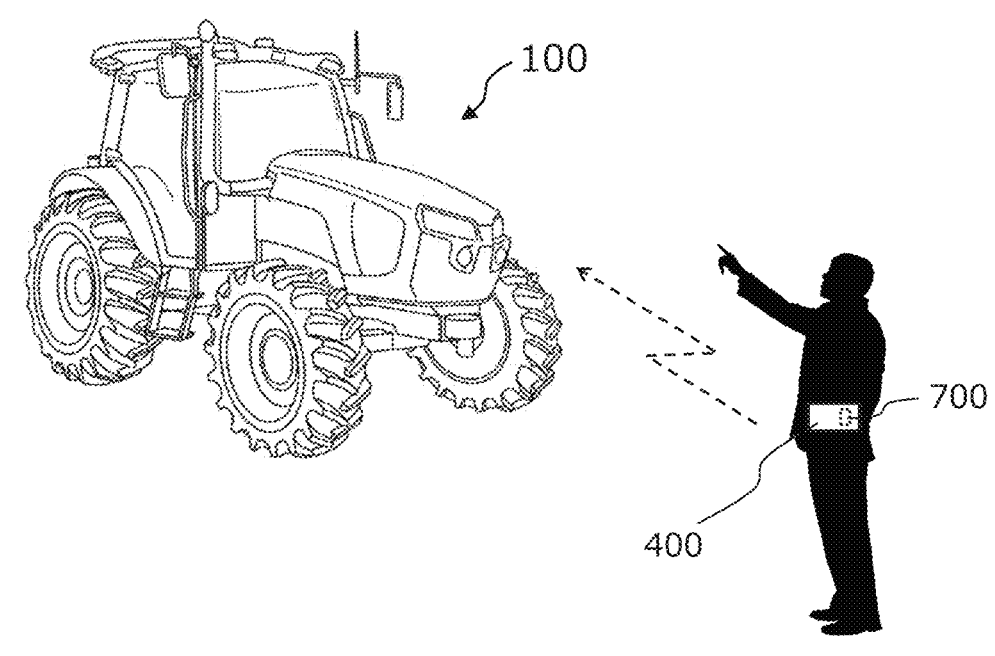
FIG. 11A is a diagram showing a person in the field performing a gesture from a location relatively close to the work vehicle.
Figure 11B:
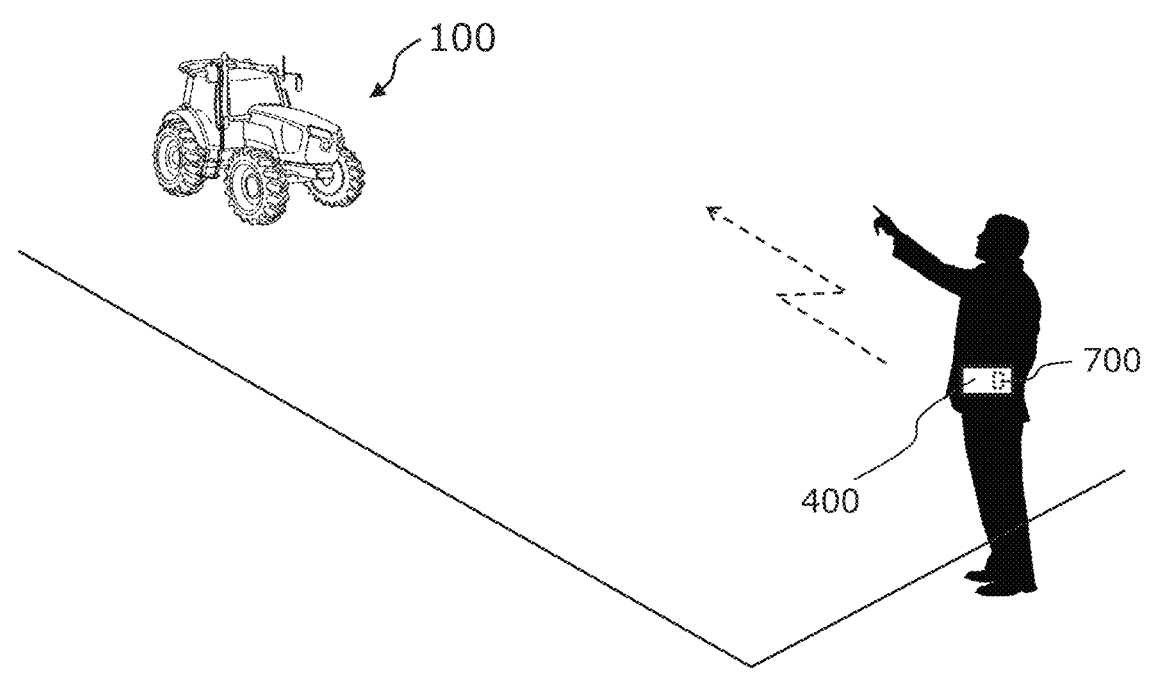
FIG. 11B is a diagram showing a person in the periphery of the field performing a gesture from a location relatively far from the work vehicle.

FIG. 11A shows a person in the field performing a gesture from a location relatively close to the work vehicle 100. FIG. 11B shows a person in the periphery of the field performing a gesture from a location relatively far from the work vehicle 100. In each of the examples shown in FIG. 11A and FIG. 11B, a person is located forward of the work vehicle 100 and is performing the gesture. However, the location of the person is not limited to forward of the work vehicle 100, and may perform a gesture to the work vehicle 100 from any direction. The person in the example shown in FIG. 11A is performing a gesture toward the work vehicle 100 from a location at a distance of, for example, 3 m to 10 m from the work vehicle 100. The person in the example shown in FIG. 11B is performing a gesture toward the work vehicle 100 from a location at a distance of, for example, about 10 m to about 20 m from the work vehicle 100. In these examples, the camera 120, of the four cameras 120, provided on the front of the roof of the work vehicle 100 captures an image of the person in FIG. 11A or FIG. 11B. The cameras 120 capture images of a person performing a gesture and acquires motion information of the person. As another example, if a person (e.g., a manager) located rearward of the work vehicle 100 is performing a gesture, the camera 120, of the four cameras 120, provided on the rear of the roof of the work vehicle 100 captures an image of the person. For example, even if the work vehicle 100 is stopped, if the work vehicle 100 is idling, the cameras 120 are activated and can capture images at any time.

The minimum shooting distance of a person can depend primarily on the lens specifications of the camera. If the person is within the angle of view of the camera, for example, it is possible to capture an image of the person even if the distance between the work vehicle and the person is a short distance (e.g., about 0.5 m or less). An operation performed by a person from such a short distance via a gesture is also included in the "remote operation". As for shooting from a long distance, a person may perform remote operation from a distance away from the work vehicle 100 to the extent that it does not affect the accuracy of gesture recognition and person recognition to be described below.

Figure 12:
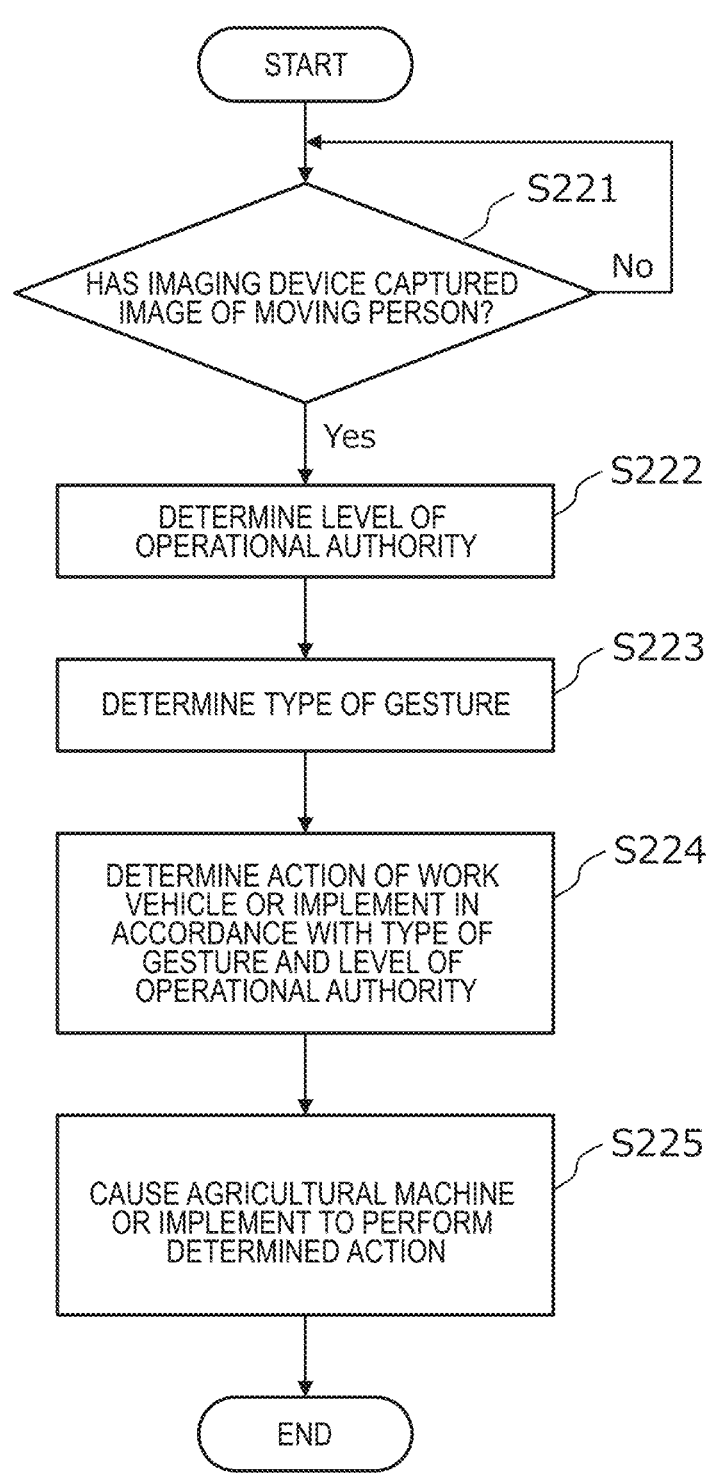
FIG. 12 is a flowchart showing a procedure for remotely operating the agricultural machine based on the type of gesture and the level of operational authority.

Referring to FIG. 12, an example of a procedure for remotely operating an agricultural machine according to the type of gesture and the level of operational authority will be described.

FIG. 12 is a flowchart showing a procedure for remotely operating an agricultural machine according to the type of gesture and the level of operational authority. In the present example embodiment, the cameras 120, the processor 161 and the controller 180 together perform step S221 to step S225 shown in FIG. 12 to cause the agricultural machine to perform a desired action according to the type of gesture and the level of operational authority.

Step S221

The processor 161 determines whether a camera 120 has captured a person in motion. Specifically, the processor 161 determines whether the camera 120 has acquired motion information of a person performing a gesture. For example, the processor 161 detects whether there is a moving object within the angle of view of the camera 120 by performing motion detection based on the image data output from the camera 120. Examples of algorithms used for motion detection include optical flow, template matching, block matching, or estimation using a background difference or mixed normal distribution model. Then, when the processor 161 determines that there is a moving object within the angle of view, the processor 161 uses an image recognition technique to determine whether the moving object is a person, for example.

Step S222

The work vehicle 100 illustrated in FIG. 3 includes the receiver 250 for communicating with the transmitter 700 carried by the person. In the example shown in FIG. 11A or FIG. 11B, the person carries the terminal 400 (e.g., a mobile terminal) on which the transmitter 700 is implemented. Note, however, that the transmitter 700 does not need to be implemented in the mobile terminal and may be an independent device. An example of the transmitter 700 is a transmitter used for beacon or RFID communication. In the present example embodiment, the communication protocol between the transmitter 700 and the receiver 250 conforms to the beacon standard or the RFID standard.

When communicating in conformity with the RFID standard, for example, radio communication can be performed using the 860 MHz to 960 MHz frequency band (UHF band). Using the UHF band, it is possible to communicate from a relatively remote location from the work vehicle 100. An example of the transmitter 700 is an RF tag, and an example of the receiver 250 is a reader (or reader/writer) that includes an antenna that receives signals transmitted from the transmitter 700 and a processor that processes the signals received by the antenna.

When communicating in conformity with the beacon standard, for example, wireless communication using BLE (Bluetooth Low Energy) wireless communication technology can be used. An example of the transmitter 700 is a beacon tag and an example of the receiver 250 is a beacon receiver that supports BLE. When using a beacon, since the distance between the receiver and the transmitter can be determined, the processor 161, for example, can recognize whether a person carrying a beacon tag is moving closer to the work vehicle 100 based on the output data from the beacon receiver.

Transmission data including identification information associated with the person is transmitted from the transmitter 700 and received by the receiver 250 of the work vehicle 100. Based on the transmission data received by the receiver 250, it is possible to determine the level of operational authority granted to the person carrying the transmitter 700 or to determine whether the person has operational authority.

The processor 161 of the present example embodiment determines the level of operational authority granted to the person. Some example methods for determining the level of operational authority will now be described.

In the first example, operational authority is distinguished between two levels, i.e., "authorized"/"unauthorized" and "high"/"low" level. A person with a high level of operational authority or a person with operational authority is allowed to carry the transmitter 700, while a person with a low level of operational authority or a person without operational authority is not allowed to carry the transmitter 700. In this example, a signal is sent from the transmitter 700 notifying that the person is granted operational authority. Receipt of this signal means that a person who is granted the "high" level of operational authority or a person having operational authority is present in the environment around the work vehicle 100. Therefore, when the receiver 250 receives the transmission data, the processor 161 can determine that the person performing a gesture in the surrounding environment is granted the "high" level of operational authority or that the person has operational authority.

In the second example, a user of the agricultural management system, e.g., an agricultural business executive, uses a VT such as the terminal 400 or the operational terminal 200 to set an operational authority for a person involved in agricultural work. This setting can be done, for example, in conjunction with the creation of a work plan, or prior to the start of agricultural work in the field. For example, the operational authority set by the terminal 400 is associated with identification information to identify the person and transmitted to the management device 600. Upon receiving such information, the management device 600 creates a table that maps the operational authority granted to the person to the identification information of the person, and records the table in the storage 650. The identification information in the present example embodiment is information that is unique to a person who is granted operational authority, and can be expressed in 2 bytes, for example.

FIGS. 13A to 13C are each a diagram showing an example of a table that maps the identification information of a person to the level of operational authority granted to the person. The levels of operational authority in the example shown in FIG. 13A include the "high" level, which is the second operational authority, and the "low" level, which is the first operational authority. In the illustrated example, Person A, who is an agricultural business executive, is assigned the identification "0xAA" and is granted the "high" level as the operational authority. Persons B and C, who are agricultural workers, are assigned the identifiers "0xBB" and "0xCC", respectively, and Persons B and C are each granted the "Low" level as the operational authority. Person D, who is a manager, is assigned the identification "0xDD" and is granted the "high" level as the operational authority.

The levels of operational authority in the example shown in FIG. 13B include the "highest" level, which is the third operational authority, the "high" level, which is the second operational authority, and the "low" level, which is the first operational authority. In the illustrated example, Person A, who is an agricultural business executive, is granted the "highest" level as the operational authority. Persons B, C, and D are as described above.

The level of operational authority in the example shown in FIG. 13C is represented by the presence/absence of operational authority. In this example, Persons A and D have operational authority, and Persons B and C do not have operational authority. Only information about Persons A and D who have operational authority are set by the terminal 400, and information about Persons B and C who do not have operational authority are not set by the terminal 400. Note, however, that information about persons who do not have operational authority may also be set by the terminal 400. The tables illustrated in FIG. 13A to FIG. 13C are stored in the storage 650. The management device 600 transmits a table to the work vehicle 100 in response to a request from the work vehicle 100. The work vehicle 100 stores the received table in the storage 170.

The transmitter 700 outputs transmission data including ID information unique to the device of the transmitter 700. The unique ID information includes, for example, ID information unique to the beacon tag or RF tag. When the receiver 250 installed in the work vehicle 100 receives the transmission data output from the transmitter 700 carried by a person, the unique ID information is acquired from the transmission data. The acquired ID information is transmitted to the processor 161.

Identification information is associated with a person so that the information matches with the ID information unique to the transmitter 700 carried by the person. In the examples shown in FIGS. 13A to 13C, for example, the unique ID information for the transmitter 700 carried by Person A is "0xAA", and the identification information for Person A can be assigned the same ID information as the unique ID information for the transmitter 700. The same is true for Persons B to D.

When the receiver 250 acquires ID information unique to the transmitter 700, for example, the controller 180 refers to a table that maps the identification information associated with the person to the operational authority granted to the person, and determines, based on the unique ID information, the level of operational authority or whether the person is granted operational authority. For example, when the receiver 250 acquires the unique ID information "0xAA" from the transmitter 700 carried by Person A, the controller 180 can determine, by referring to the table, that the operational authority granted to Person A is the "high" level. Alternatively, when the receiver 250 acquires ID information unique to the transmitter 700, the receiver 250 may transmit the acquired unique ID information to the management device 600 to inquire about the level of operational authority associated with the unique ID information or whether the person identified from the unique ID information has operational authority.

If three or more levels of operational authority are granted to persons, as illustrated in FIG. 13B, a table can be used to determine the levels of operational authority granted to persons. When two levels of operational authority are granted to persons, as illustrated in FIG. 13A or FIG. 13C, it is not necessary to use a table, and the first example described above may be adopted. Note, however, that from the standpoint of it reliability and certainty, is preferred that the presence/absence of operational authority or the level of operational authority be determined based on the identification information by referring to the table.

In the third example, the processor 161 acquires identification information associated with a person by analyzing image data, which is sensing data, output from the camera 120 to perform person recognition (or image recognition). For example, the processor 161 extracts feature quantities related to the person from the image data and determines operational authority based on the extracted feature quantities. In this example, the identification information of the person can be, for example, feature quantities represented by an n-dimensional vector in an n-dimensional feature space. When facial recognition is difficult, for example, features obtained from the person's clothing may be employed as the feature quantities of the person. When the user performs the task of setting the operational authority to be granted to a person using the terminal 400 or VT, the user may, for example, captures an image of the person with the camera. The user may, for example, input data of the captured image to the terminal 400 in which a person recognition algorithm is implemented, and register in advance the feature quantities (i.e., identification information) of the person obtained by analyzing the data of the captured image and the operational authority associated with each other. Also in this example, a table is created and recorded in the storage 650 that maps together the identification information of the person and the operational authority granted to the person.

In the fourth example, instead of carrying the transmitter 700, the person granted operational authority may wear clothing that includes retroreflective material, e.g., a reflective vest. In this example, when an image of the person wearing a reflective vest is captured, for example, the brightness values of the pixels in the area of the retroreflective material in the captured image are relatively higher than the brightness values of the pixels in other areas. For example, if the average value of the brightness values of the pixels included in a particular area in the captured image is higher than a threshold value, the processor 161 may determine that the person captured is granted operational authority.

Step S223

The processor 161 may recognize the type of gesture performed by the person using the algorithm used to detect a moving object described above. For example, the processor 161 of the present example embodiment recognizes the trajectory of a gesture performed by a person based on image data output from at least one camera 120 when motion information is acquired. The processor 161 determines the type of gesture based on the result of comparing the trajectory of the gesture with specific patterns. For example, the processor 161 generates time-series data of image feature quantities obtained from difference images between consecutive frames of a video image, and obtains motion feature quantities from the time-series data. The processor 161 can recognize the trajectory of a gesture based on the motion feature quantities. Comparison between the trajectory of a gesture and specific patterns is performed, for example, by pattern matching. Alternatively, an algorithm for gesture detection that introduces the concept of pose and directional vector obtained by quantizing an object as described in Japanese Laid-Open Patent Publication No. 2014-221636, for example, can be applied to gesture recognition of the present example embodiment. The entire disclosure of Japanese Laid-Open Patent Publication No. 2014-221636 is herein incorporated by reference.

The types of gestures include motion patterns of various actions that can be realized by gestures and/or hand gestures. Considering capturing an image of a person who is relatively far away in the outdoors, large movements by gestures and/or hand gestures are preferred over subtle and local movements of hands and fingers. Gestures include, for example, an action of crossing both arms in front, an action of drawing a circle with both arms, an action of swinging both arms left and right, an action of swinging both arms up and down, an action of thrusting one arm forward, an action of rotating the right arm and/or left arm, an action of bending knees, an action of trotting or stepping on the spot, an action of bowing, and an action of repeatedly putting on and taking off a hat. Note, however, that these actions are only examples of gestures. For example, templates corresponding to trajectories of gestures may be used in pattern matching.

The processor 161 can perform matching between the trajectory of the acquired gesture and the template on the pixel level, for example.

Step S224

The processor 161 determines the action of the agricultural machine according to the type of gesture determined in step S223 and the level of operational authority determined in step S222. In other words, actions that a person can instruct the agricultural machine to perform by remote operation vary depending on the type of gesture and the level of operational authority.

When a person is granted the first operational authority, the processor 161 determines an action to be performed by the agricultural machine from a group of actions included in the first group according to the type of gesture. When a person is granted the second operational authority, the processor 161 determines an action to be performed by the work vehicle 100 or the implement 300 from a group of actions included in the second group according to the type of gesture. As illustrated in FIG. 13A, the first operational authority may have the "low" level and the second operational authority may have the "high" level. Alternatively, as illustrated in FIG. 13C, the first operational authority may mean "authorized" and the second operational authority may mean "unauthorized".

FIG. 14 is a diagram showing the relationship between the first group and the second group. The first group includes a group of actions that a person granted the first operational authority can instruct the work vehicle 100 to perform. The second group includes a group of actions that a person granted the second operational authority can instruct the work vehicle 100 or the implement 300 to perform. The second group includes all the actions included in the first group. Each of the first group and the second group may include at least one of the action of stopping the work vehicle 100 and the action of decelerating the work vehicle 100. Each of the first group and the second group of the present example embodiment includes both an action of stopping and an action of decelerating. In the present example embodiment, even a person granted the "low" level of operational authority or a person who does not have operational authority, can cause the work vehicle 100 to perform an action in the first group, i.e., an action of stopping or decelerating, by remote operation. In other words, a person can stop or decelerate a running agricultural machine by performing a specific gesture, regardless of the operational authority of the person.

Actions of the second group may further include, for example, at least one of causing the work vehicle 100 to start traveling when the work vehicle 100 is stopped, causing the prime mover 102 to stop when the work vehicle 100 is stopped, causing the implement 300 to perform actions in general, causing the work vehicle 100 to move out of the field, and causing the work vehicle 100 outside the field to perform actions in general. The second group of the present example embodiment includes all of these actions. Examples of actions performed by the implement 300 include raising or lowering the implement 300, or starting or stopping an action. Examples of actions performed by the work vehicle 100 outside the field include actions such as starting, decelerating or stopping the travel of the work vehicle 100 on an agricultural road. All of these actions also belong to the second group. Note, however, that the actions described above belonging to the first and second groups are only examples, and any action that can be performed by the work vehicle 100 or the implement 300 can be included in the groups.

When at least one camera 120 captures an image of a person performing a first type of gesture while the work vehicle 100 is traveling, the processor 161 selects, from among a group of actions belonging to the first group, an action of stopping or decelerating the work vehicle 100, regardless of the level of operational authority granted to the person. Examples of the first type of gesture include an action of momentarily crossing both arms in front or an action of trotting or stepping on the spot. Thus, any person involved in agricultural work can bring the work vehicle 100 to an emergency stop by momentarily performing the first type of gesture toward the work vehicle 100 in an emergency, for example. According to this remote operation, workers can take necessary measures according to the situation at hand, regardless of the operational authority.

When the work vehicle 100 is stopped, if at least one camera 120 captures an image of a person performing the second type of gesture and the person is granted the second operational authority, the processor 161 can select, from among a group of actions belonging to the second group, an action of causing the work vehicle 100 to start traveling or an action of causing the prime mover 102 of the work vehicle 100 to stop. The second type of gesture is preferably an action that is not normally performed by a worker. Examples of the second type of gesture include an action of drawing a circle with both arms and an action of thrusting one arm forward. For example, when a person captured by the camera 120 performs an action of drawing a circle with both arms and the person is granted the "high" level of operational authority, the processor 161 selects, from the second group, an action of starting the travel of the work vehicle 100. When a person captured by the camera 120 performs an action of thrusting one arm forward and the person is granted the "high" level of operational authority, the processor 161 selects, from the second group, an action of stopping the prime mover 102 of the work vehicle 100. With this remote operation, a person granted the "high" level of operational authority or a person having operational authority is performing a particular type of gesture, it is possible to cause the stopped work vehicle 100 to start traveling and to cause the prime mover 102 to stop. In other words, even if a person granted the "low" level of operational authority or a person without operational authority performs the same gesture as a person granted the "high" level of operational authority, the work vehicle 100 will not respond to the gesture and remain stopped. Thus, for example, only an agricultural business executive or manager with operational authority can cause the work vehicle 100 to start traveling or stop the prime mover. As a result, it is possible to prevent an agricultural machine from performing an action in response to an erroneous remote operation by a person without operational authority.

If the action corresponding to the type of gesture is outside the scope of the operational authority, the gesture is ignored and the agricultural machine is allowed to continue the current action. If the agricultural machine is stopped, the agricultural machine is allowed to remain stopped. Allowing the agricultural machine to continue the current action is also included as an action to be determined in accordance with the type of gesture and the level of operational authority.

Further conditions may be set for causing the stopped work vehicle 100 to start traveling or for stopping the prime mover 102. For example, a particular camera, from among the plurality of cameras, e.g., a camera installed at the rear of the roof of the work vehicle 100, may be used as a dedicated camera to capture an image of a person having operational authority. It is preferred that only the person with operational authority knows the location of the dedicated camera. In this example, remote operation is enabled when a person with operational authority performs the second type of gesture from the rear of the work vehicle 100. In other words, if a worker without operational authority performs the second type of gesture from the front or side of the work vehicle 100, the work vehicle 100 will not respond to the gesture and will remain stopped. Further conditions can be added in this way.

When at least one camera 120 captures an image of a person performing a predetermined gesture, the processor 161 selects an action, from among a group of actions belonging to the second group, to be performed by the implement 300 in accordance with the type of gesture performed by the person, if the person is granted the second operational authority. For example, when a person captured by the camera 120 performs an action of swinging both arms left and right and the person is granted the "high" level of operational authority, the processor 161 selects an action, from the second group, of raising or lowering the implement 300. With this remote operation, it is possible to cause the implement 300 to perform a desired action when a person granted the "high" level of operational authority or a person with operational authority is performing a particular type of gesture. For example, only an agricultural business executive or manager granted the "high" level of operational authority can operate the implement 300. In other words, even if a person granted the "low" level of operational authority or a person without operational authority performs the same gesture as a person granted the "high" level of operational authority, the implement 300 will not respond to the gesture and will remain stopped. As a result, the remote operation of the implement 300 can be performed smoothly depending on the operational authority.

The groups classifying the actions of the agricultural machine in accordance with the operational authority may further include, in addition to the first group and the second group, one or more groups in accordance with the number of levels of operational authority. For example, the groups may include the first to third groups corresponding to the three levels of operational authority.

FIG. 15 is a diagram showing the relationship between the first group, the second group and the third group. The first group includes a group of actions that a person granted the first operational authority can cause the work vehicle 100 to perform. The second group includes a group of actions that a person granted the second operational authority can cause the work vehicle 100 or the implement 300 to perform. The third group includes a group of actions that a person granted the third operational authority can cause the work vehicle 100 to perform. As illustrated in FIG. 13B, the first operational authority has the "low" level, the second operational authority has the "high" level, and the third operational authority has the "highest" level. The second group includes all actions included in the first group, and the third group includes all actions included in the second group. That is, the third group includes all actions included in the first group and the second group. As compared with the example shown in FIG. 14, the action of causing the work vehicle 100 to move out of the field and actions to be performed by the work vehicle 100 outside the field belong to the third group, and only persons granted the "highest" level of operational authority can cause the work vehicle 100 to move out of the field or operate the work vehicle 100 outside the field.

When the work vehicle 100 is in the field, when at least one camera 120 captures an image of a person performing the third type of gesture and the person is granted the third operational authority, the processor 161 selects, from among a group of actions belonging to the third group, an action of causing the work vehicle 100 to move out of the field. Examples of the third type of gestures include an action of rotating the right arm and/or the left arm. The third operational authority has the highest level of a plurality of levels. Note that where the levels of operational authority are defined as two levels of "high" and "low," the third operational authority level corresponds to the "high" level. When a person captured by the camera 120 performs an action of rotating the right arm, for example, and the person is granted the "highest" level of operational authority, the processor 161 selects an action, from among the third group, of causing the work vehicle 100 to move out of the field. With this remote operation, only a person granted the "highest" level of operational authority, e.g., an agricultural business executive or manager, can cause the work vehicle 100 to move out of the field.

When the work vehicle 100 is outside the field, if at least one camera 120 captures an image of a person performing a predetermined gesture and the person is granted the third operational authority, the processor 161 selects, from among a group of actions belonging to the third group, an action to be performed by the work vehicle 100 in accordance with the type of gesture performed by the person. For example, when the work vehicle 100 is traveling on an agricultural road, if a person captured by the camera 120 performs an action of bowing and the person is granted the "highest" level of operational authority, the processor 161 selects, from among the third group, an action of stopping the work vehicle 100. With this remote operation, only a person granted the "highest" level of operational authority, e.g., an agricultural business executive or manager, can operate the work vehicle 100 outside the field.

When there are a plurality of persons performing gestures within the angle of view of one camera 120, or when there are persons performing gestures within the angles of view of multiple cameras 120, the processor 161 may determine an action to be performed by the work vehicle 100 or the implement 300 in accordance with the type of gesture performed by a person granted the highest level of operational authority. For example, suppose that one camera 120 captures a first person performing a gesture and a second person performing a gesture of a different type than the gesture performed by the first person. Then, if the first person (e.g., a worker) is granted the first operational authority (e.g., the "low" level) and the second person (e.g., a manager) is granted the second operational authority (e.g., the "high" level), the processor 161 determines an action to be performed by the work vehicle 100 or the implement 300 in accordance with the type of gesture performed by the second person. For example, if a person granted the "low" level of operational authority performs a different type of gesture than a person granted the "high" level of operational authority, the work vehicle 100 will not respond to the gesture performed by the person granted the "low" level of operational authority. Thus, by giving a higher priority to a remote operation performed by a person granted the "high" level of operational authority when there are a plurality of persons performing different gestures, it is possible to realize smooth self-driving in accordance with the operational authority.

Step S225

The processor 161 causes the agricultural machine to perform the action determined in step S224. More particularly, the controller 180 causes the work vehicle 100 or the implement 300 to perform the action determined in step S224 in response to a command from the processor 161.

With the remote operation of the present example embodiment, the agricultural machine can be easily operated from a distance even in an environment with relatively loud environmental noise such as an engine. In particular, it is possible for a person who knows gestures corresponding to such actions to cause the agricultural machine to stop or decelerate, as required to be done quickly in the case of an emergency, regardless of whether the person has operational authority. On the other hand, only a specific person with operational authority can cause the agricultural machine to move out of the field or remotely operate the implement. Note that the remote operation of the present example embodiment can be applied to the operation of agricultural machines capable of self-traveling, regardless of whether it is human driving or unmanned driving.

The gesture recognition system of the present example embodiment of the disclosure can be used in an agricultural machine having a controller and performing self-driving. The gesture recognition system includes at least one sensor, a processor, and a terminal. An example of a processor is the processor 161 of the agricultural machine or the processor 660 of the management device 600. The processor is configured or programmed to recognize the type of gesture based on sensing data output from the at least one sensor when motion information of the person performing the gesture is acquired. The gesture recognition system instructs the controller to cause the agricultural machine to perform an action determined based on the type of gesture and the operational authority granted to the person.

The gesture recognition systems described above can be retrofitted to agricultural machines that do not have those features. Such systems can be manufactured and sold independently of agricultural machines. A computer program used in such systems can also be manufactured and sold independently of agricultural machines. The computer program may be provided, for example, stored on a computer-readable non-transitory storage medium. The computer program may also be provided through downloading via telecommunication lines (e.g., the Internet).

The techniques and example embodiments according to the present disclosure are applicable to the control of agricultural machines, such as tractors, harvesters, rice transplanters, vehicles for crop management, vegetable transplanters, mowers, seeders, spreaders, or agricultural robots, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine capable of performing self-driving comprising:

a controller configured or programmed to control an action of the agricultural machine; and at least one sensor to sense an environment around the agricultural machine; wherein when the at least one sensor acquires motion information of a person performing a gesture, the controller is configured or programmed to cause the agricultural machine to perform an action determined based on a type of the gesture and an operational authority granted to the person;

the operational authority includes a plurality of levels with different actions or different groups of actions to be performed by the agricultural machine; and the controller is configured or programmed to cause the agricultural machine to perform an action determined in accordance with the type of gesture and the level of operational authority.

2. The agricultural machine of claim 1, wherein, when the at least one sensor acquires the motion information, the controller is configured or programmed to:

cause the agricultural machine to perform an action included in a first group in accordance with the type of gesture when a first operational authority is granted to the person; and cause the agricultural machine to perform an action included in a second group, which includes all actions included in the first group, in accordance with the type of gesture when a second operational authority, which is a higher level of authority than the first operational authority, is granted to the person.

3. The agricultural machine of claim 2, wherein the first group and the second group each include at least one of an action of stopping the agricultural machine and an action of decelerating the agricultural machine; and when the at least one sensor acquires motion information of a person performing a first type of gesture while the agricultural machine is traveling, the controller is configured or programmed to cause the agricultural machine to stop or decelerate, regardless of the level of operational authority granted to the person.

4. The agricultural machine of claim 2, wherein the second group includes at least one of an action of starting travel of the agricultural machine and an action of stopping a prime mover of the agricultural machine; and when the at least one sensor acquires motion information of a person performing a second type of gesture while the agricultural machine is stopped and the second operational authority is granted to the person, the controller is configured or programmed to start travel of the agricultural machine or stops the prime mover of the agricultural machine.

5. The agricultural machine of claim 2, further comprising:

an implement to perform an action under control of the controller; wherein the second group includes an action to be performed by the implement; and when the at least one sensor acquires the motion information and the second operational authority is granted to the person, the controller is configured or programmed to cause the implement to perform an action determined in accordance with the type of gesture.

6. The agricultural machine of claim 2, wherein the second operational authority has a highest level of the plurality of levels;

the second group includes an action in which the agricultural machine moves out of a field; and where the agricultural machine is in the field, when the at least one sensor acquires motion information of a person performing a third type of gesture and the second operational authority is granted to the person, the controller is configured or programmed to cause the agricultural machine to move out of the field.

7. The agricultural machine of claim 2, wherein the second operational authority has a highest level of the plurality of levels;

the second group includes an action to be performed when the agricultural machine is outside the field; and where the agricultural machine is outside the field, when the at least one sensor acquires the motion information and the second operational authority is granted to the person, the controller is configured or programmed to cause the agricultural machine to perform an action determined in accordance with the type of gesture.

8. The agricultural machine of claim 2, wherein when the at least one sensor acquires motion information of a first person performing a gesture and motion information of a second person performing a gesture of a different type from the gesture performed by the first person, the controller is configured or programmed to cause the agricultural machine to perform an action determined in accordance with the type of gesture performed by the second person if the first operational authority is granted to the first person and the second operational authority is granted to the second person.

9. The agricultural machine of claim 2, further comprising a receiver to receive a signal indicating that the second operational authority is granted to the person.

10. The agricultural machine of claim 9, wherein the second group includes at least one of an action in which the agricultural machine starts traveling and an action of stopping a prime mover of the agricultural machine; and where the agricultural machine is stopped, when the at least one sensor acquires motion information of a person performing a second type of gesture and the receiver receives the signal, the controller is configured or programmed to cause the agricultural machine to start traveling or stop the prime mover of the agricultural machine.

11. The agricultural machine of claim 9, further comprising:

an implement to perform an action under control of the controller; wherein the second group includes an action to be performed by the implement; and when the at least one sensor acquires the motion information and the receiver receives the signal, the controller is configured or programmed to cause the implement to perform an action determined in accordance with the type of gesture.

12. The agricultural machine of claim 9, wherein the second operational authority has the highest level of the plurality of levels;

the second group includes an action in which the agricultural machine moves out of a field; and where the agricultural machine is in the field, when the at least one sensor acquires motion information of a person performing a third type of gesture and when the receiver receives the signal, the controller is configured or programmed to cause the agricultural machine to move out of the field.

13. The agricultural machine of claim 9, wherein the second operational authority has a highest level of the plurality of levels;

the second group includes an action to be performed when the agricultural machine is outside the field; and where the agricultural machine is outside the field, when the at least one sensor acquires the motion information and the receiver receives the signal, the controller is configured or programmed to cause the agricultural machine to perform an action determined in accordance with the type of gesture.

14. The agricultural machine of claim 9, wherein a communication protocol between a transmitter carried by a person and the receiver conforms to a beacon standard or an RFID standard.

15. The agricultural machine of claim 1, further comprising:

a processor configured or programmed to process sensing data output from the at least one sensor;

the processor is configured or programmed to recognize a trajectory of the gesture based on the sensing data output from the at least one sensor when the motion information is acquired; and the controller is configured or programmed to cause the agricultural machine to perform an action determined based on a result of comparison between a trajectory of the gesture and a specific pattern.

16. The agricultural machine of claim 15, wherein the processor is configured or programmed to perform person recognition by analyzing the sensing data to acquire identification information associated with the person; and the controller is configured or programmed to control an action of the agricultural machine in accordance with an operational authority determined based on the identification information.

17. The agricultural machine of claim 1, further comprising:

a receiver to receive a signal that is transmitted from a transmitter carried by a person and that includes identification information associated with the person; and a storage to store a table that maps identification information associated with a person to an operational authority granted to the person; wherein the controller is configured or programmed to cause the agricultural machine to perform an action determined based on the operational authority of the person determined by referring to the table, using the identification information acquired by the receiver.

18. The agricultural machine of claim 1, wherein the gesture performed by a person includes an action using an object worn by the person.

19. A gesture recognition system for use in an agricultural machine capable of performing self-driving and including a controller configured or programmed to control an action of the agricultural machine, the gesture recognition system comprising:

at least one sensor to sense an environment around the agricultural machine;

a processor configured or programmed to process sensing data output from the at least one sensor; and a terminal usable to set an operational authority for a person involved in agricultural work; wherein the operational authority includes a plurality of levels with different actions or different groups of actions to be performed by the agricultural machine;

the processor is configured or programmed to recognize a type of gesture based on the sensing data output from the at least one sensor when motion information of the person performing the gesture is acquired; and the gesture recognition system instructs the controller to cause the agricultural machine to perform an action determined based on the type of gesture and the level of operational authority granted to the person.

\*　\*　\*　\*　\*